(12) United States Patent
Fukumori

(10) Patent No.: US 9,939,045 B2
(45) Date of Patent: Apr. 10, 2018

(54) LINK PLATES FOR BICYCLE CHAIN

(71) Applicant: Shimano Inc., Sakai, Osaka (JP)

(72) Inventor: Tsuyoshi Fukumori, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 15/212,153

(22) Filed: Jul. 15, 2016

(65) Prior Publication Data

US 2018/0017131 A1    Jan. 18, 2018

(51) Int. Cl.
*F16G 13/02* (2006.01)
*F16G 13/06* (2006.01)

(52) U.S. Cl.
CPC ................... *F16G 13/06* (2013.01)

(58) Field of Classification Search
CPC .......... F16G 13/06; F16G 13/18; B62M 9/00; B62M 2009/005; F16H 7/06
USPC ........................ 474/206, 226, 230
See application file for complete search history.

(56) References Cited

U.S. PATENT DOCUMENTS

| 1,953,388 | A | * | 4/1934 | Bettin | ..................... | E02F 3/144 |
| | | | | | | 198/851 |
| 2,199,292 | A | * | 4/1940 | Pierce | ..................... | F16G 13/04 |
| | | | | | | 305/198 |
| 2,715,340 | A | * | 8/1955 | Acri | ..................... | F16G 13/06 |
| | | | | | | 474/230 |
| 3,242,752 | A | * | 3/1966 | Acri | ..................... | F16G 13/06 |
| | | | | | | 474/230 |
| 4,102,216 | A | * | 7/1978 | Nagano | ..................... | F16G 13/02 |
| | | | | | | 474/231 |
| 4,265,134 | A | * | 5/1981 | Dupoyet | ................ | F16G 13/06 |
| | | | | | | 474/231 |
| 4,741,725 | A | * | 5/1988 | Ingold | ..................... | B62M 9/12 |
| | | | | | | 474/212 |
| 4,983,147 | A | * | 1/1991 | Wu | ..................... | F16G 13/06 |
| | | | | | | 474/206 |
| 5,098,349 | A | * | 3/1992 | Wu | ..................... | F16G 13/06 |
| | | | | | | 474/206 |
| 5,203,745 | A | * | 4/1993 | Wang | ..................... | F16G 13/06 |
| | | | | | | 474/206 |
| 5,226,857 | A | * | 7/1993 | Ono | ..................... | B62M 9/06 |
| | | | | | | 474/231 |
| 5,267,909 | A | * | 12/1993 | Iacchetta | ................ | F16G 13/04 |
| | | | | | | 474/206 |

(Continued)

FOREIGN PATENT DOCUMENTS

DE    19904954 A1    8/2000
JP    S55-052115 Y2    12/1980

*Primary Examiner* — Henry Y Liu
(74) *Attorney, Agent, or Firm* — Global IP Counselors, LLP

(57) ABSTRACT

A link plate for a bicycle chain is basically provided with a first link end portion, a second link end portion and a link intermediate portion interconnecting the first link end portion and the second link end portion. The first link end portion includes a first link opening having a first link center axis. The second link end portion includes a second link opening having a second link center axis parallel to the first link center axis. The link plate has a link longitudinal centerline defining a longitudinal direction. The first link end portion has a first extended edge portion extending away from the second link end portion in the longitudinal direction or the link intermediate portion has an axial protrusion protruding from an inner surface thereof in the axial direction.

14 Claims, 12 Drawing Sheets

(56) References Cited

U.S. PATENT DOCUMENTS

| | | | | |
|---|---|---|---|---|
| 5,288,278 A * | 2/1994 | Nagano | ............... | B62M 9/00 474/228 |
| 5,322,482 A * | 6/1994 | Wang | ............... | B62M 9/00 474/206 |
| 5,322,483 A * | 6/1994 | Wang | ............... | F16G 13/06 474/206 |
| 5,709,075 A * | 1/1998 | Wu | ............... | F16G 13/06 474/206 |
| 7,325,391 B1 * | 2/2008 | Oishi | ............... | F16G 13/06 474/206 |
| 7,500,928 B2 * | 3/2009 | Hummel | ............... | F16G 13/06 474/228 |
| 8,066,604 B2 * | 11/2011 | Righi | ............... | F16G 13/06 474/206 |
| 8,157,683 B2 * | 4/2012 | Korse | ............... | F16G 13/06 474/156 |
| 8,250,846 B2 * | 8/2012 | Soerensen | ............... | F16G 13/20 198/784 |
| D734,590 S * | 7/2015 | Evers | ............... | D34/29 |
| 9,255,624 B2 * | 2/2016 | Fukumori | ............... | F16G 13/06 |
| 9,303,725 B2 * | 4/2016 | Fukumori | ............... | B62M 9/00 |
| 9,303,726 B2 * | 4/2016 | Fukumori | ............... | B62M 9/00 |
| 2008/0287239 A1 * | 11/2008 | Korse | ............... | F16G 13/06 474/231 |
| 2009/0124444 A1 * | 5/2009 | Soerensen | ............... | F16G 13/20 474/206 |
| 2012/0322599 A1 * | 12/2012 | Oishi | ............... | F16G 13/06 474/230 |
| 2015/0094180 A1 * | 4/2015 | Fukumori | ............... | B62M 9/00 474/206 |
| 2015/0094181 A1 * | 4/2015 | Fukumori | ............... | B62M 9/00 474/206 |
| 2015/0308542 A1 * | 10/2015 | Fukumori | ............... | B62M 9/00 474/230 |

\* cited by examiner

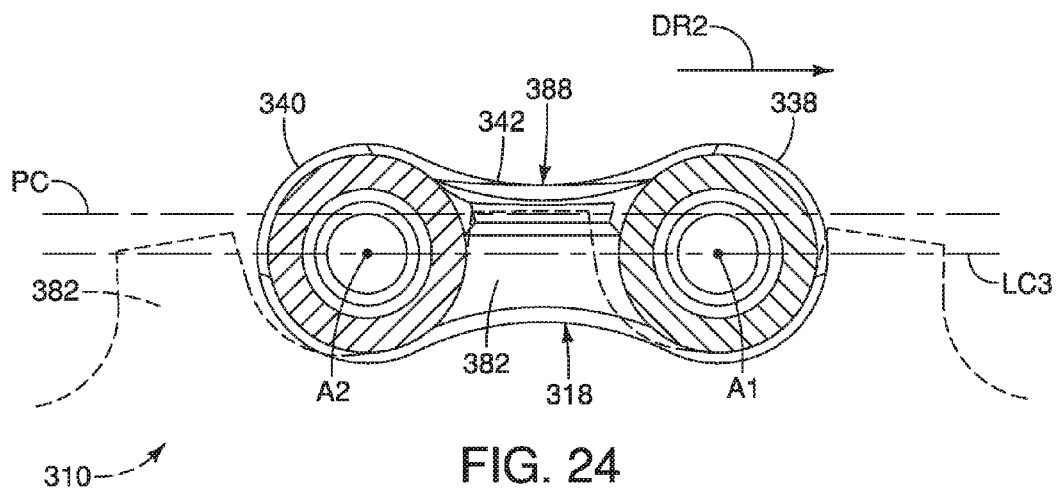
FIG. 24
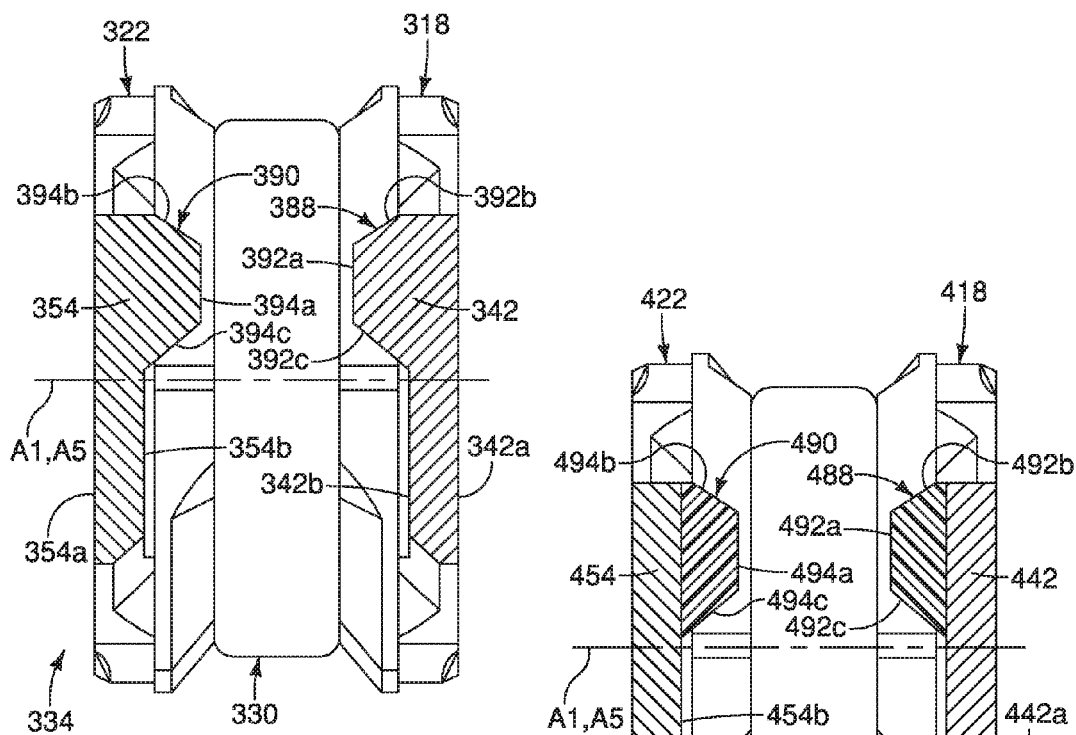
FIG. 25
FIG. 26

LINK PLATES FOR BICYCLE CHAIN

BACKGROUND

Field of the Invention

This invention generally relates to a link plate for a bicycle chain.

Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been recently redesigned is the bicycle chain.

Most bicycles have a drive train that uses a bicycle chain to transmit the pedaling action from the rider to the rear wheel. The bicycle chain has a plurality of inner links and a plurality of outer links that are interconnected in an alternating manner by a plurality of pins. Typically, each of the inner links includes a pair of inner link plates. Each of the outer links includes a pair of outer link plates.

SUMMARY

Generally, the present disclosure is directed to various features of a link plate for a bicycle chain.

In view of the state of the known technology and in accordance with a first aspect of the present disclosure, an inner link plate for a bicycle chain is basically provided that includes a first inner-link end portion, a second inner-link end portion and an inner-link intermediate portion interconnecting the first inner-link end portion and the second inner-link end portion. The first inner-link end portion includes a first inner-link opening having a first inner-link center axis. The second inner-link end portion includes a second inner-link opening having a second inner-link center axis parallel to the first inner-link center axis. The inner link plate has an inner-link longitudinal centerline defining a longitudinal direction that bisects the inner link plate into a first half and a second half. The first inner-link end portion has a first extended edge portion extending away from the second inner-link end portion in the longitudinal direction. A majority of the first extended edge portion is disposed on one of the first half and the second half.

In accordance with a second aspect of the present invention, the inner link plate according to the first aspect is configured so that the first extended edge portion is offset from the inner-link longitudinal centerline.

In accordance with a third aspect of the present invention, the link plate for a bicycle chain according to the first or second aspect is configured so that the first extended edge portion defines a projection that is at least partially spaced away from the inner-link longitudinal centerline.

In accordance with a fourth aspect of the present invention, the inner link plate according to the third aspect is configured so that the projection is integrally formed with the first inner-link end portion, the second inner-link end portion and the inner-link intermediate portion as a single unitary member.

In accordance with a fifth aspect of the present invention, the inner link plate according to the third aspect is configured so that the projection is a separate member from the first inner-link end portion.

In accordance with a sixth aspect of the present invention, the inner link plate according to the fifth aspect is configured so that the projection includes a metallic material.

In accordance with a seventh aspect of the present invention, the inner link plate according to the fifth aspect is configured so that the projection includes a non-metallic material.

In accordance with an eighth aspect of the present invention, the inner link plate according to any one of the first to seventh aspects is configured so that a majority of the first extended edge portion is disposed mostly on one side of a tangent line that is tangent to the first inner-link opening and the second inner-link opening and that is opposite to the other side of the tangent line that is defined between the inner-link longitudinal centerline and the tangent line.

In accordance with a ninth aspect of the present invention, the inner link plate according to any one of the first to eighth aspects is configured so that the second inner-link end portion has a second extended edge portion extending away from the first inner-link end portion in the longitudinal direction, and a majority of the second extended edge portion being disposed on the one of the first half and the second half.

In accordance with a tenth aspect of the present invention, the inner link plate according to the ninth aspect is configured so that the first extended edge portion defines a first projection that is spaced away from the inner-link longitudinal centerline, and the second extended edge portion defines a second projection that is spaced away from the inner-link longitudinal centerline.

In accordance with an eleventh aspect of the present invention, the inner link according to the tenth aspect is configured so that the first and second projections are integrally formed with the first inner-link end portion, the second inner-link end portion and the inner-link intermediate portion as a single unitary member.

In accordance with a twelfth aspect of the present invention, an outer link plate for a bicycle chain is provided that basically comprises a first outer-link end portion, a second outer-link end portion and an outer-link intermediate portion interconnecting the first outer-link end portion and the second outer-link end portion. The outer link plate has an outer-link longitudinal centerline. The first outer-link end portion includes a first outer-link opening having a first outer-link center axis. The second outer-link end portion includes a second outer-link opening having a second outer-link center axis parallel to the first outer-link center axis. The outer-link intermediate portion has an outer-link outer surface and an outer-link inner surface that is opposite to the outer-link outer surface in an axial direction parallel to the first outer-link center axis. The outer-link intermediate portion includes an axial protrusion protruding from the outer-link inner surface in the axial direction. The axial protrusion is offset from the outer-link longitudinal centerline.

In accordance with a thirteenth aspect of the present invention, the outer link plate according to the twelfth aspect is configured so that the axial protrusion is spaced away from the outer-link longitudinal centerline.

In accordance with a fourteenth aspect of the present invention, the outer link plate according to the twelfth aspect is configured so that the axial protrusion is integrally formed with the first outer-link end portion, the second outer-link end portion and the outer-link intermediate portion as a single unitary member.

In accordance with a fifteenth aspect of the present invention, the outer link plate according to the twelfth aspect is configured so that the axial protrusion is a separate member from the outer-link intermediate portion.

In accordance with a sixteenth aspect of the present invention, the outer link plate according to the fifteenth aspect is configured so that the axial protrusion includes a metallic material.

In accordance with a seventeenth aspect of the present invention, the outer link plate according to the fifteenth aspect is configured so that the axial protrusion includes a non-metallic material.

In accordance with an eighteenth aspect of the present invention, the outer link plate according to any one of the twelfth to seventeenth aspects is configured so that a majority of the axial protrusion is disposed mostly on one side of a tangent line that is tangent to the first outer-link opening and the second outer-link opening and that is opposite to the other side of the tangent line that is defined between the outer-link longitudinal centerline and the tangent line.

In accordance with a nineteenth aspect of the present invention, the outer link plate according to any one of the twelfth to seventeenth aspects is configured so that the axial protrusion includes an axial end surface that is offset from the outer-link inner surface in the axial direction, and an inclined surface that is inclined relative to the axial end surface towards the outer-link longitudinal centerline.

In accordance with a twentieth aspect of the present invention, a bicycle chain link is provided that basically comprises a primary inner link plate and a secondary inner link plate. The primary inner link plate has a primary inner-link longitudinal centerline defining a primary longitudinal direction. The primary inner link plate comprises a first inner-link end portion, a second inner-link end portion and a primary inner-link intermediate portion interconnecting the first inner-link end portion and the second inner-link end portion. The first inner-link end portion includes a first inner-link opening having a first inner-link center axis. The second inner-link end portion includes a second inner-link opening having a second inner-link center axis parallel to the first inner-link center axis. The primary inner-link longitudinal centerline bisects the primary inner link plate into a first half and a second half. The first inner-link end portion has a first extended edge portion extending away from the second inner-link end portion in the primary longitudinal direction. A majority of the first extended edge portion is disposed on one of the first half and the second half. The secondary inner link plate has a secondary inner-link longitudinal centerline defining a secondary longitudinal direction. The secondary inner link plate comprises a third inner-link end portion, a fourth inner-link end portion and a secondary inner-link intermediate portion interconnecting the third inner-link end portion and the fourth inner-link end portion. The third inner-link end portion includes a third inner-link opening having a third inner-link center axis. A fourth inner-link end portion includes a fourth inner-link opening having a fourth inner-link center axis parallel to the third inner-link center axis.

In accordance with a twenty-first aspect of the present invention, the bicycle chain link according to the twentieth aspect is configured so that the secondary inner-link longitudinal centerline bisects the secondary inner link plate into a first half and a second half. The third inner-link end portion has a third extended edge portion extending away from the fourth inner-link end portion in the secondary longitudinal direction, and a majority of the third extended edge portion is disposed on one of the first half and the second half of the secondary inner link plate.

In accordance with a twenty-second aspect of the present invention, the bicycle chain link according to the twentieth or twenty-first aspect is configured so that the third inner-link end portion is free of an extended edge portion extending away from the fourth inner-link end portion in the secondary longitudinal direction.

In accordance with a twenty-third aspect of the present invention, a bicycle chain link is provided that basically comprises a primary outer link plate and a secondary outer link plate. The primary outer link plate has a primary outer-link longitudinal centerline. The primary outer link plate comprises a first outer-link end portion, a second outer-link end portion and a primary outer-link intermediate portion interconnecting the first outer-link end portion and the second outer-link end portion. The first outer-link end portion includes a first outer-link opening having a first outer-link center axis. The second outer-link end portion includes a second outer-link opening having a second outer-link center axis parallel to the first outer-link center axis. The primary outer-link intermediate portion has a primary outer-link outer surface and a primary outer-link inner surface that is opposite to the primary outer-link outer surface in an axial direction parallel to the first outer-link center axis. The primary outer-link intermediate portion includes a primary axial protrusion protruding from the primary outer-link inner surface in the axial direction. The primary axial protrusion is offset from the primary outer-link longitudinal centerline. The secondary outer link plate has a secondary outer-link longitudinal centerline. The secondary outer link plate comprises a third outer-link end portion, a fourth outer-link end portion and a secondary outer-link intermediate portion interconnecting the third outer-link end portion and the fourth outer-link end portion. The third outer-link end portion includes a third outer-link opening having a third outer-link center axis. A fourth outer-link end portion includes a fourth inner-link opening having a fourth outer-link center axis parallel to the third outer-link center axis. The secondary outer-link intermediate portion has a secondary outer-link outer surface and a secondary outer-link inner surface that is opposite to the secondary outer-link outer surface in an axial direction parallel to the third outer-link center axis.

In accordance with a twenty-fourth aspect of the present invention, the bicycle chain link according to the twenty-third aspect is configured so that the secondary outer-link intermediate portion includes a secondary axial protrusion protruding from the secondary outer-link inner surface in the axial direction, and the secondary axial protrusion is offset from the secondary outer-link longitudinal centerline.

In accordance with a twenty-fifth aspect of the present invention, the bicycle chain link according to the twenty-third or twenty-fourth aspect is configured so that the secondary outer-link intermediate portion is free of an axial protrusion protruding from the secondary outer-link inner surface in the axial direction.

Also other objects, features, aspects and advantages of the disclosed link plate for a bicycle chain will become apparent to those skilled in the art from the following detailed description, which, taken in conjunction with the annexed drawings, discloses exemplary embodiments of the link plate for a bicycle chain.

BRIEF DESCRIPTION OF THE DRAWINGS

Referring now to the attached drawings which form a part of this original disclosure:

FIG. 24 is an enlarged partial elevational view of the outer link plate illustrated in FIG. 19 engaging a tooth of the bicycle rear sprocket;

FIG. 25 is a cross-sectional view of the bicycle chain taken along line 25-25 of FIG. 17;

FIG. 26 is a cross-sectional view of a bicycle chain in accordance with a fifth exemplary embodiment of the present invention in which an axial protrusion includes a non-metallic material;

DETAILED DESCRIPTION OF EXEMPLARY EMBODIMENTS

Selected exemplary embodiments will now be explained with reference to the drawings. It will be apparent to those skilled in the bicycle field from this disclosure that the following descriptions of the exemplary embodiments are provided for illustration only and not for the purpose of limiting the invention as defined by the appended claims and their equivalents.

Because the various parts of a bicycle are well known in the bicycle art, these parts of the bicycle will not be discussed or illustrated in detail herein, except as they are modified in accordance with the exemplary embodiments of the present invention.

Figure 1:
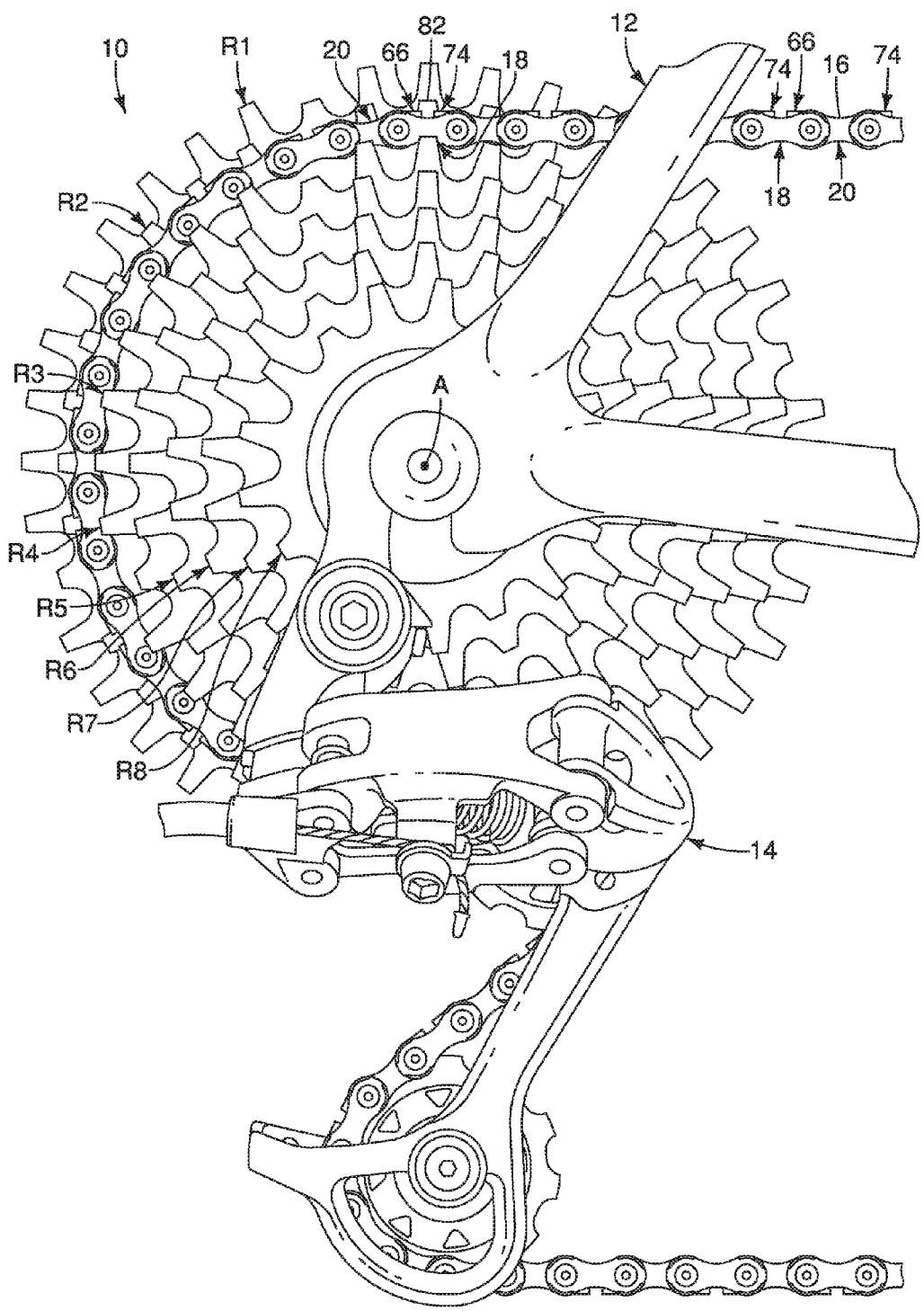
FIG. 1 is a side elevational view of a bicycle that is equipped with a link plate for a bicycle chain in accordance with a first exemplary embodiment of the present invention.
Figure 2:
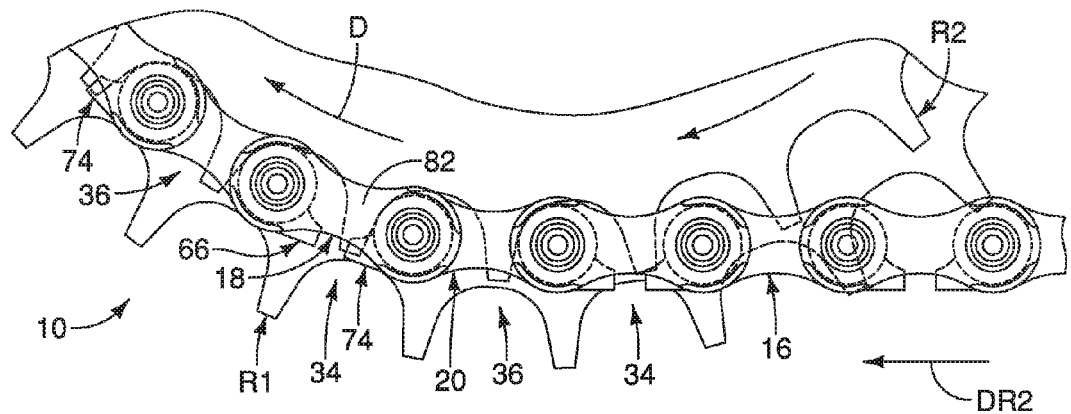
FIG. 2 is an outside partial elevational view of the bicycle chain engaging a bicycle rear sprocket.

Referring initially to FIGS. 1 and 2, a bicycle rear sprocket 10 includes first to eighth rear sprockets R1 to R8 having different numbers of teeth from each other. The first to eighth rear sprockets R1 to R8 are rotatable in a direction D relative to a bicycle frame 12 about a rotation axis A. The first to eighth rear sprockets R1 to R8 are lined up in an axial direction parallel to the rotation axis A. The first to eighth rear sprockets R1 to R8 are arranged in the axial direction with respect to a rotational center axis of the rear sprockets R1 to R8. The first rear sprocket R1 includes the largest number of teeth in the first to eighth rear sprockets R1 to R8. The eighth rear sprocket R8 includes the smallest number of teeth in the first to eighth rear sprockets R1 to R8. The sprockets R1 to R8 can include modified teeth, such as teeth having inclined surfaces, and/or recesses to facilitate downshifting and upshifting operations. It will be apparent to those skilled in the bicycle field from this disclosure that a bicycle rear sprocket 10 can have fewer or more sprockets.

As illustrated in FIG. 1, a rear derailleur 14 is mounted on the bicycle frame 12 and is configured to guide a bicycle chain 16 from one rear sprocket to another adjacent rear sprocket among the first to eighth rear sprockets R1 to R8. Because the rear derailleur 14 includes well known structures, they will not be described in detail herein.

Referring to FIGS. 1 to 5, the bicycle chain 16 includes first outer link plates 18, first inner link plates 20, second outer link plates 22, second inner link plates 24, first link pins 26, second link pins 28, first rollers 30, and second rollers 32. Each opposed pair of the first outer link plate 18 and the second outer link plate 22 forms an outer link 34. Each opposed pair of the first inner link plate 20 and the second inner link plate 24 forms an inner link 36. The inner links 36 are interconnected in an alternating manner with the outer links 34 by the first link pins 26 and the second link pins 28. A master chain link (not shown) preferably interconnects two pairs of the inner links 36 together to form a single continuous loop.

Figure 4:
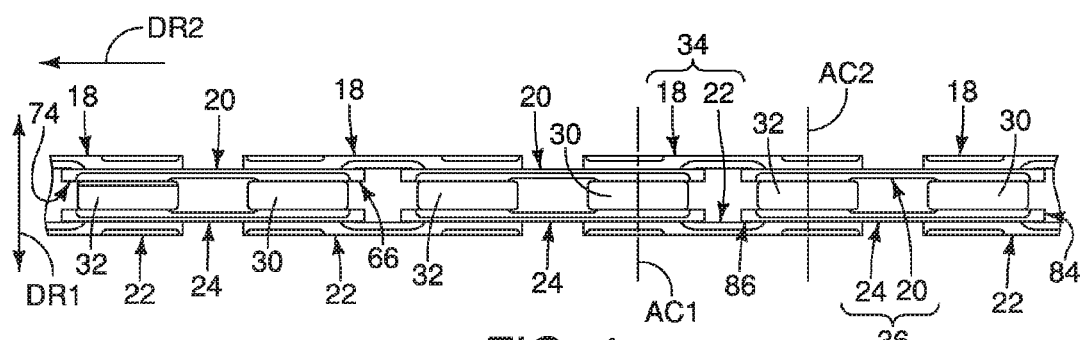
FIG. 4 is a partial plan view of the bicycle chain illustrated in FIG. 1.

As illustrated in FIG. 4, the second outer link plates 22 are spaced apart from the first outer link plates 18 in a transverse direction DR1 of the bicycle, respectively. The first inner link plates 20 and the second inner link plates 24 are provided between the first outer link plates 18 and the second outer link plates 22 in the transverse direction DR1.

More specifically, the first inner link plate 20 is provided between the first outer link plate 18 and the second outer link plate 22 in the transverse direction DR1. The second inner link plate 24 is provided between the first outer link plate 18 and the second outer link plate 22 in the transverse direction DR1. The first inner link plate 20 is provided between the first outer link plate 18 and the second inner link plate 24 in the transverse direction DR1. The second inner link plate 24 is provided between the first inner link plate 20 and the second outer link plate 22 in the transverse direction DR1. The first outer link plate 18 and the first inner link plate 20 are configured to be positioned closer to the bicycle frame 12 than the second outer link plate 22 and the second inner link plate 24 respectively in a state where the bicycle chain 16 engages with the bicycle rear sprocket 10 (FIGS. 1 and 2).

Figure 3:
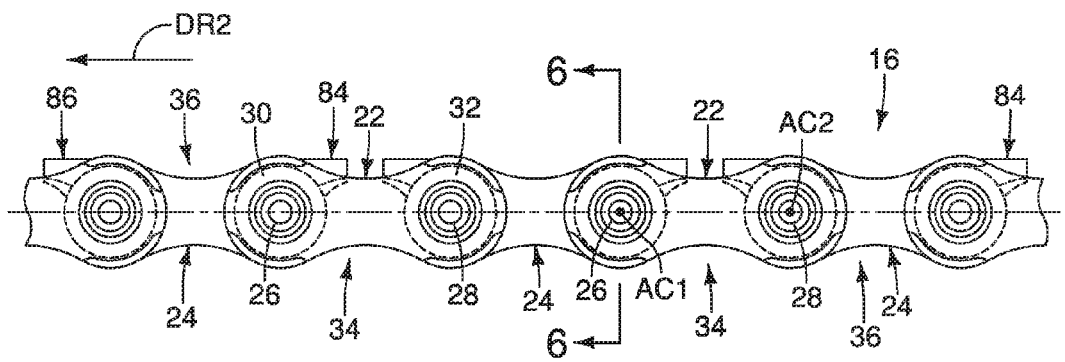
FIG. 3 is a partial side elevational view of the bicycle chain illustrated in FIG. 1.

Referring to FIGS. 2 to 4, the outer links 34 and the inner links 36 are alternately arranged in a chain driving direction DR2. The chain driving direction DR2 is defined with respect to the bicycle chain 16 as a direction in which the bicycle chain 16 is driven by the rider's pedaling force to forwardly move the bicycle. The bicycle chain 16 can include a mark indicating the chain driving direction DR2. The outer links 34 are rotatably coupled to the inner links 36, respectively. More specifically, the first outer link plate 18 and the second outer link plate 22 are rotatably coupled to the first inner link plate 20 and the second inner link plate 24 about first rotation axes AC1 by the first link pins 26, respectively. The first outer link plate 18 and the second outer link plate 22 are rotatably coupled to the first inner link plate 20 and the second inner link plate 24 about second rotation axes AC2 by the second link pins 28, respectively.

As illustrated in FIG. 3, the first link pins 26 and the second link pins 28 are alternately arranged in the chain driving direction DR2. The first rotation axes AC1 and the second rotation axes AC2 are alternately arranged in the chain driving direction DR2. The first rotation axes AC1 and the second rotation axes AC2 are substantially parallel to the transverse direction DR1 in a state where the bicycle chain 16 is mounted on the front crankset (not shown) and the bicycle rear sprocket 10 (FIGS. 1 and 2).

As illustrated in FIG. 3, the first rollers 30 are provided between the first inner link plates 20 and the second inner link plates 24, respectively. The second rollers 32 are provided between the first inner link plates 20 and the second inner link plates 24, respectively. The first rollers 30 and the second rollers 32 are alternately arranged in the chain driving direction DR2.

Referring to FIG. 3, each of the first link pins 26 has a cylindrical shape and includes a through-hole extending along the first rotation axis AC1. Each of the second link pins 28 has a cylindrical shape and includes a through-hole extending along the second rotation axis AC2. The first rotation axes AC1 are defined as center axes of the first link pins 26, respectively. The second rotation axes AC2 are defined as center axes of the second link pins 28, respectively. While the first link pins 26 have substantially the same shape as a shape of the second link pins 28, it will be apparent to those skilled in the bicycle field that the first link pins 26 can have a different shape from the shape of the second link pins 28. It will be apparent to those skilled in the bicycle field that the first link pins 26 and the second link pins 28 can have a recess at each end instead of the through-hole.

As illustrated in FIG. 4, each of the first rollers 30 is rotatable relative to the opposed pair of the first inner link plate 20 and the second inner link plate 24 about the first rotation axis AC. Each of the second rollers 32 is rotatable relative to the opposed pair of the first inner link plate 20 and the second inner link plate 24 about the second rotation axis AC2. While the first rollers 30 have substantially the same shape as a shape of the second rollers 32, it will be apparent to those skilled in the bicycle field that the first rollers 30 can have a different shape from the shape of the second rollers 32.

Figure 5:
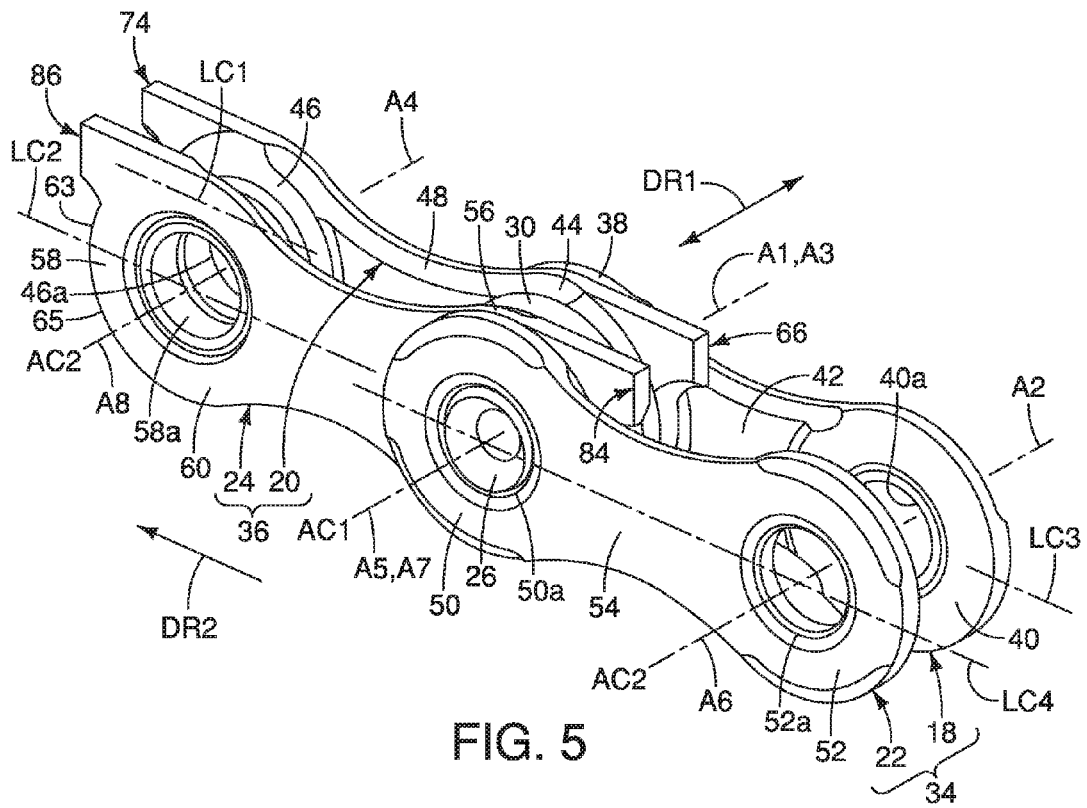
FIG. 5 is an enlarged perspective view of a portion of the bicycle chain illustrated in FIG. 3.

Referring to FIG. 5, each of the first outer link plates 18 comprises a first end portion 38, a second end portion 40, and a first intermediate portion 42. The first end portion 38 includes a first opening 38a (FIG. 6) through which one of the first link pins 26 extends. The second end portion 40 includes a second opening 40a through which one of the second link pins 28 (FIG. 3) extends. The first intermediate portion 42 is provided between the first end portion 38 and the second end portion 40. The first intermediate portion 42 interconnects the first end portion 38 and the second end portion 40. The second end portion 40 is positioned upstream of the first end portion 38 with respect to the chain driving direction DR2 in a state where the bicycle chain 16 engages with the bicycle rear sprocket 10 (FIGS. 1 and 2). The first end portion 38, the second end portion 40, and the first intermediate portion 42 are integrally provided with each other as a one-piece unitary member. The first outer link plate 18 is made of a hard and/or rigid material, such as a metallic material.

Figure 6:
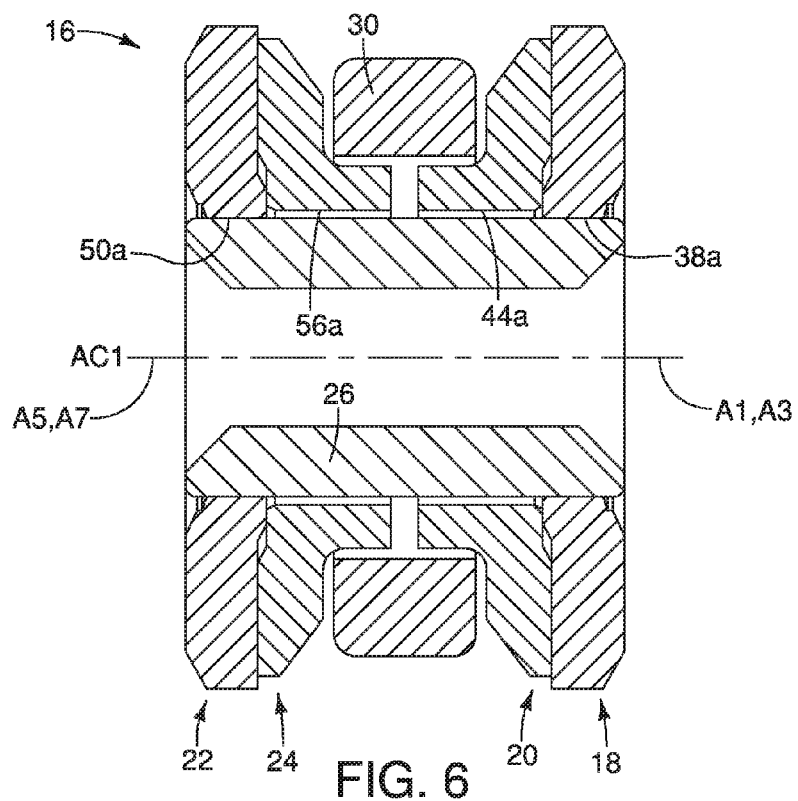
FIG. 6 is a cross-sectional view of the bicycle chain taken along line 6-6 of FIG. 3.

As illustrated in FIGS. 5 and 6, the first opening 38a has a first center axis A1, and the second opening 40a has a second center axis A2. The first center axis A1 is substantially parallel to the first rotation axis AC1 and substantially coincides with the first rotation axis AC1. The second center axis A2 is substantially parallel to the second rotation axis AC2 and substantially coincides with the second rotation axis AC2. The first center axis A1 can be defined by the first rotation axis AC1. The second center axis A2 can be defined by the second rotation axis AC2. Accordingly, the second center axis A2 is parallel to the first center axis A1. While the first opening 38a and the second opening 40a are illustrated as two separate and distinct openings, it will be apparent to those skilled in the bicycle field that a single elongated slot can extend between the first opening 38a and the second opening 40a. Thus, the term "opening" should not be limited to a continuous circular hole that extends 360 degrees.

Referring to FIGS. 5 and 6, each of the first inner link plates 20 comprises a third end portion 44, a fourth end portion 46, and a second intermediate portion 48. The third end portion 44 includes a third opening 44a through which one of the first link pins 26 (FIG. 3) extends. The fourth end portion 46 includes a fourth opening 46a through which one of the second link pins 28 extends. The second intermediate portion 48 is provided between the third end portion 44 and the fourth end portion 46. The second intermediate portion 48 interconnects the third end portion 44 and the fourth end portion 46. The third end portion 44 of the first inner link plate 20 is positioned upstream of the fourth end portion 46 of the first inner link plate 20 with respect to the chain driving direction DR2 in a state where the bicycle chain 16 engages with the bicycle rear sprocket 10 (FIGS. 1 and 2). The third end portion 44, the fourth end portion 46, and the second intermediate portion 48 are integrally provided with each other as a one-piece unitary member. The first inner link plate 20 is made of a hard and/or rigid material, such as a metallic material.

Figure 7:
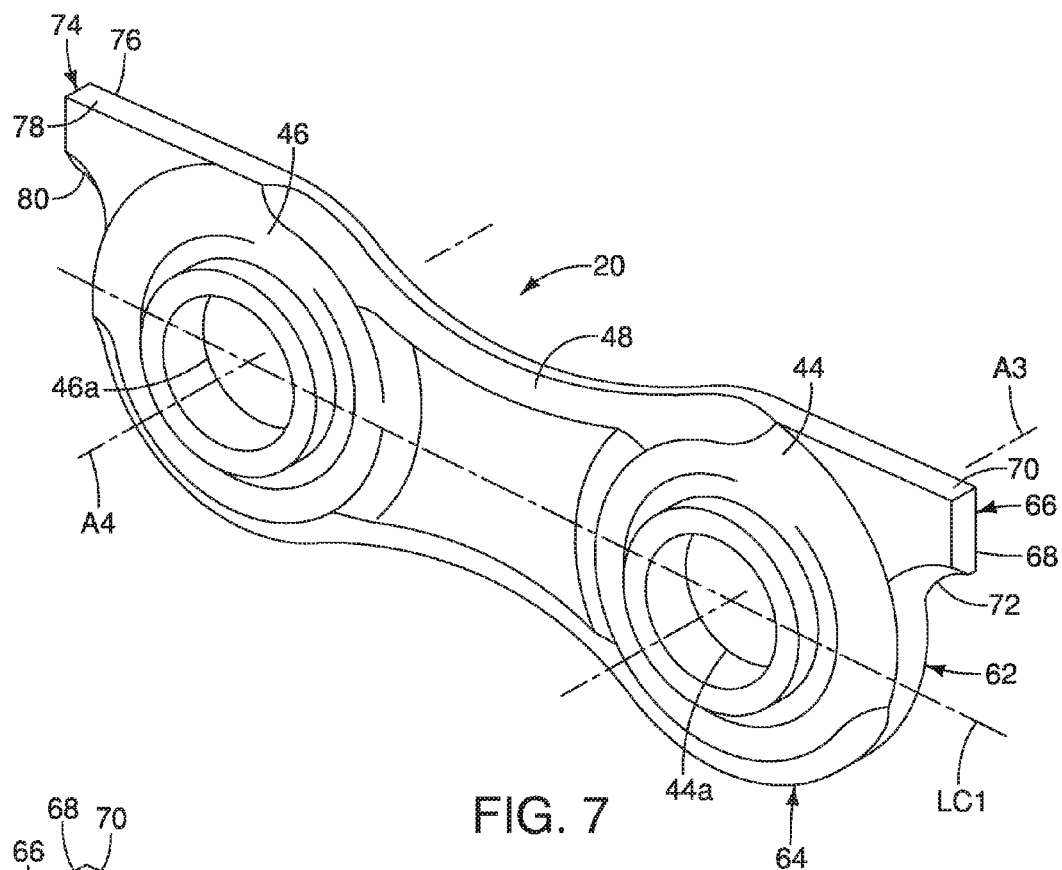
FIG. 7 is an inside perspective view of an inner link plate illustrated in FIG. 5.
Figure 8:
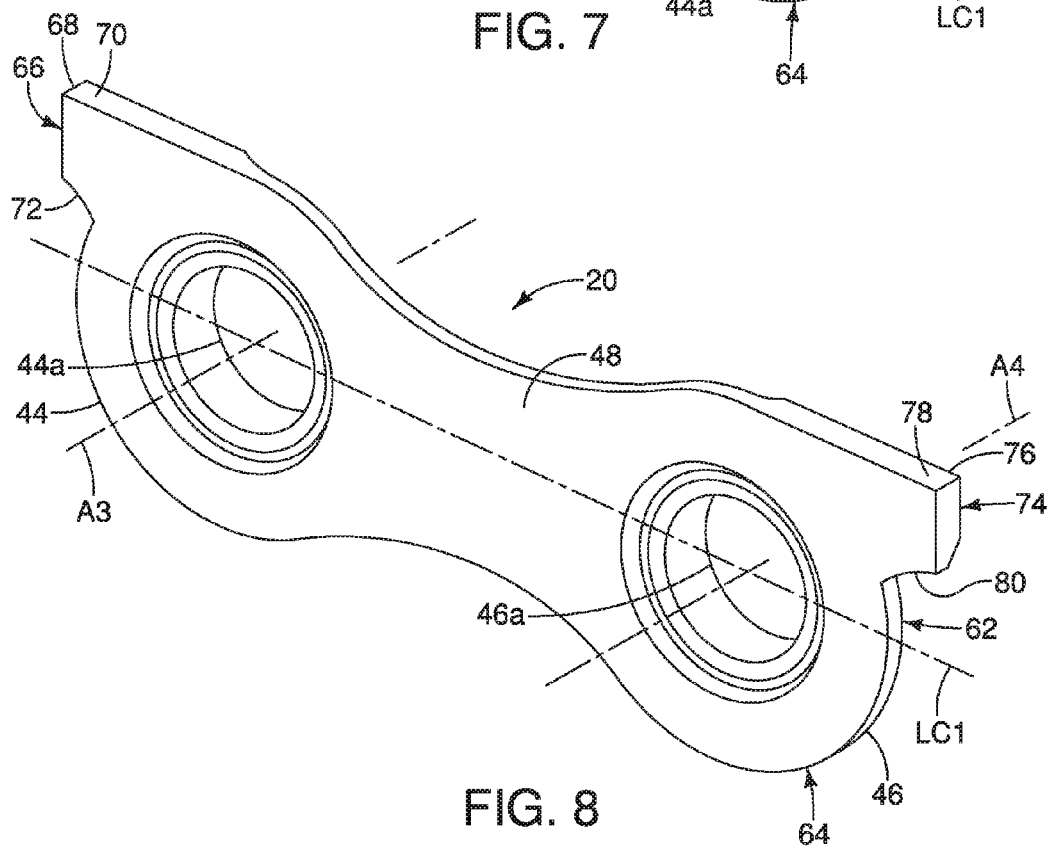
FIG. 8 is an outside perspective view of the inner link plate illustrated in FIG. 7.

As illustrated in FIGS. 5 and 6, the third opening 44a has a third center axis A3, and the fourth opening 46a has a fourth center axis A4. The third center axis A3 is substantially parallel to the first rotation axis AC1 and substantially coincides with the first rotation axis AC1. The fourth center axis A4 is substantially parallel to the second rotation axis AC2 and substantially coincides with the second rotation axis AC2. The third center axis A3 can be defined by the first rotation axis AC1. The fourth center axis A4 can be defined by the second rotation axis AC2. The third center axis A3 is parallel to the fourth center axis A4. While the third opening 44a and the fourth opening 46a are illustrated as two separate and distinct openings, as shown in FIGS. 7 and 8, it will be apparent to those skilled in the bicycle field that a single elongated slot can extend between the third opening 44a and the fourth opening 46a. Thus, the term "opening" should not be limited to a continuous circular hole that extends 360 degrees.

Referring to FIG. 5, each of the second outer link plates 22 comprises a fifth end portion 50, a sixth end portion 52, and a third intermediate portion 54. The fifth end portion 50 includes a fifth opening 50a through which one of the first link pins 26 extends. The sixth end portion 52 includes a sixth opening 52a through which one of the second link pins 28 extends. The third intermediate portion 54 is provided between the fifth end portion 50 and the sixth end portion 52. The third intermediate portion 54 interconnects the fifth end portion 50 and the sixth end portion 52. The sixth end portion 52 is positioned upstream of the fifth end portion 50 with respect to the chain driving direction DR2 in a state where the bicycle chain 16 engages with the bicycle rear sprocket 10 (FIGS. 1 and 2). The fifth end portion 50, the sixth end portion 52, and the third intermediate portion 54 are integrally provided with each other as a one-piece unitary member. The second outer link plate 22 is made of a hard and/or rigid material such as a metallic material.

As illustrated in FIG. 5, the fifth opening 50a has a fifth center axis A5, and the sixth opening 52a has a sixth center axis A6. The fifth center axis A5 is substantially parallel to the first rotation axis AC1 and substantially coincides with the first rotation axis AC1. The sixth center axis A6 is substantially parallel to the second rotation axis AC2 and substantially coincides with the second rotation axis AC2. The fifth center axis A5 can be defined by the first rotation axis AC1. The sixth center axis A6 can be defined by the second rotation axis AC2. The fifth center axis A5 is parallel to the sixth center axis A6. While the fifth opening 50a and the sixth opening 52a are illustrated as two separate and distinct openings, it will be apparent to those skilled in the bicycle field that a single elongated slot can extend between the fifth opening 50a and the sixth opening 52a. Thus, the term "opening" should not be limited to a continuous circular hole that extends 360 degrees.

Referring to FIGS. 5 and 6, each of the second inner link plates 24 comprises a seventh end portion 56, an eighth end portion 58, and a fourth intermediate portion 60. The seventh end portion 56 includes a seventh opening 56a through which one of the first link pins 26 extends. The eighth end portion 58 includes an eighth opening 58a through which one of the second link pins 28 extends. The fourth intermediate portion 60 is provided between the seventh end portion 56 and the eighth end portion 58. The fourth intermediate portion 60 interconnects the seventh end portion 56 and the eighth end portion 58. The seventh end portion 56 is positioned upstream of the eighth end portion 58 with respect to the chain driving direction DR2 in a state where the bicycle chain 16 engages with the bicycle rear sprocket 10. The seventh end portion 56, the eighth end portion 58, and the fourth intermediate portion 60 are integrally provided with each other as a one-piece unitary member. The second inner link plate 24 is made of a hard and/or rigid material, such as a metallic material.

As illustrated in FIGS. 5 and 6, the seventh opening 56a has a seventh center axis A7, and the eighth opening 58a has an eighth center axis A8. The seventh center axis A7 is substantially parallel to the first rotation axis AC1 and substantially coincides with the first rotation axis AC1. The eighth center axis A8 is substantially parallel to the second rotation axis AC2 and substantially coincides with the second rotation axis AC2. The seventh center axis A7 can be defined by the first rotation axis AC1. The eighth center axis A8 can be defined by the second rotation axis AC2. The eighth center axis A8 is parallel to the seventh center axis A7. While the seventh opening 56a and the eighth opening 58a are illustrated as two separate and distinct openings, it will be apparent to those skilled in the bicycle field that a single elongated slot can extend between the seventh opening 56a and the eighth opening 58a. Thus, the term "opening" should not be limited to a continuous circular hole that extends 360 degrees.

As illustrated in FIGS. 5 and 6, each of the first link pins 26 is configured to extend through the first opening 38a and the third opening 44a to rotatably couple the first end portion 38 and the third end portion 44 about the first rotation axis AC1. Each of the first link pins 26 is configured to extend through the fifth opening 50a and the seventh opening 56a to rotatably couple the fifth end portion 50 and the seventh end portion 56 about the first rotation axis AC1. In the illustrated embodiment, an inner diameter of the first opening 38a is smaller than an outer diameter of the first link pin 26, and thereby the first link pins 26 are press-fitted in the first openings 38a, respectively. An inner diameter of the third opening 44a is greater than the outer diameter of the first link pin 26. The first link pin 26 extends through the third opening 44a to allow the first inner link plate 20 to rotate relative to the first link pin 26 and the first outer link plate 18. In the illustrated embodiment, an inner diameter of the fifth opening 50a is smaller than the outer diameter of the first link pin 26, and thereby the first link pins 26 are press-fitted in the fifth openings 50a, respectively. An inner diameter of the seventh opening 56a is greater than the outer diameter of the first link pin 26. The first link pin 26 extends through the seventh opening 56a to allow the second inner link plate 24 to rotate relative to the first link pin 26 and the second outer link plate 22.

As shown in FIGS. 3 and 5, each of the second link pins 28 is configured to extend through the second opening 40a and the fourth opening 46a to rotatably couple the second end portion 40 and the fourth end portion 46 about the second rotation axis AC2. Each of the second link pins 28 is configured extend through the sixth opening 52a and the eighth opening 58a to rotatably couple the sixth end portion 52 and the eighth end portion 58 about the second rotation axis AC2. In the illustrated embodiment, an inner diameter of the second opening 40a is smaller than an outer diameter of the second link pin 28, and thereby the second link pins 28 are press-fitted in the second openings 40a, respectively. An inner diameter of the fourth opening 46a is greater than the outer diameter of the second link pin 28. The second link pin 28 extends through the fourth opening 46a to allow the first inner link plate 20 to rotate relative to the second link pin 28 and the first outer link plate 18. In the illustrated embodiment, an inner diameter of the sixth opening 52a is smaller than the outer diameter of the second link pin 28, and thereby the second link pins 28 are press-fitted in the sixth openings 52a, respectively. An inner diameter of the eighth opening 58a is greater than the outer diameter of the second link pin 28. The second link pin 28 extends through the eighth opening 58a to allow the second inner link plate 24 to rotate relative to the second link pin 28 and the second outer link plate 22. Since the first link pins 26 and the second link pins 28 include well know structures, they will not be described in detail herein.

As illustrated in FIGS. 4 and 6, each of the first rollers 30 is provided between the first inner link plate 20 and the second inner link plate 24 and rotatably supported by the first inner link plate 20 and the second inner link plate 24. Each of the first rollers 30 has an annular shape and is configured to engage with the teeth of the bicycle rear sprocket 10. Each of the second rollers 32 is provided between the first inner link plate 20 and the second inner link plate 24 and rotatably supported by the first inner link plate 20 and the second inner link plate 24. Each of the second rollers 32 has an annular shape and is configured to engage with the teeth of the bicycle rear sprocket 10. Since the first rollers 30 and the second rollers 32 include well know structures, they will not be described in detail herein.

Referring to FIGS. 7 to 10, the first inner link plate 20 has a longitudinal centerline LC1 perpendicular to the third and fourth center axes A3 and A4. The longitudinal centerline LC1 defines the longitudinal direction and bisects the first inner link plate 20 into a first half 62 and a second half 64. The first half 62 is the portion of the first inner link plate 20 above the longitudinal centerline LC1 in FIGS. 7 to 10. The second half 64 is the portion of the first inner link plate 20 below the longitudinal centerline LC1 in FIGS. 7 to 10.

Referring to FIG. 5, the second inner link plate 24 has a second longitudinal centerline LC2 perpendicular to the seventh and eighth center axes A7 and A8. The second longitudinal centerline LC2 defines a second longitudinal direction and bisects the second inner link plate 24 into a first half and a second half. The first outer link plate 18 has a third longitudinal centerline LC3 perpendicular to the first and second center axes A1 and A2. The third longitudinal centerline LC3 defines a third longitudinal direction and bisects the first outer link plate 18 into a first half and a second half. The second outer link plate 22 has a fourth longitudinal centerline LC4 perpendicular to the fifth and sixth center axes A5 and A6. The fourth longitudinal centerline LC4 defines a fourth longitudinal direction and bisects the second outer link plate 22 into a first half and a second half. The first halves are the portions of the link plates above the longitudinal centerlines, and the second halves are the portions of the link plates below the longitudinal centerline.

Referring to FIGS. 2 to 5 and 7 to 11, the third end portion 44 of the first inner link plate 20 has a first extended edge portion 66 extending away from the fourth end portion 46 in the longitudinal direction. A majority of the first extended edge portion 66 is disposed in one of the first half 62 and the second half 64 of the first inner link plate 20 as bisected by the first longitudinal centerline LC1. As shown in FIGS. 7 to 10, the first extended edge portion 66 is disposed entirely in the first half 62 of the first inner link plate 20. The first extended edge portion 66 is offset from the first longitudinal centerline LC1.

The first extended edge portion 66 defines a first projection 68 that is at least partially spaced away from the first longitudinal centerline LC1, as shown in FIGS. 7 to 11. The first projection 68 has a substantially planar upper surface 70 and a beveled lower surface 72 opposite the upper surface 70. The first projection 68 is integrally formed with the third end portion 44, the fourth end portion 46 and the second intermediate portion 48 as a single unitary member.

Alternatively, the first projection 68 is a separate member from the third end portion 44. When formed as a separate member, the first projection 68 includes a metallic material. Alternatively, when formed as a separate member, the first projection 68 includes a non-metallic material. The first projection 68 can be secured to the third end portion 44 in any suitable manner, such as by bonding, when formed as a separate member from the third end portion 44.

Figure 9:
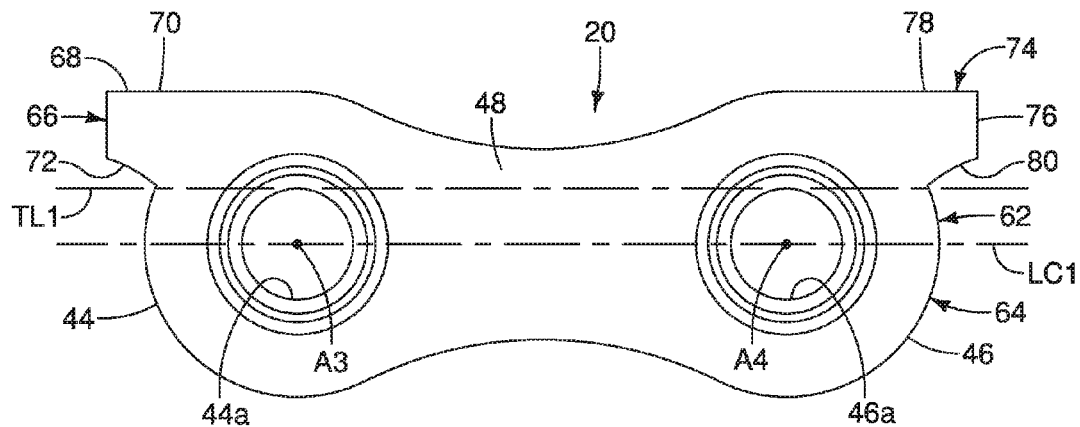
FIG. 9 is an outside elevational view of the inner link plate illustrated in FIG. 7.
Figure 10:
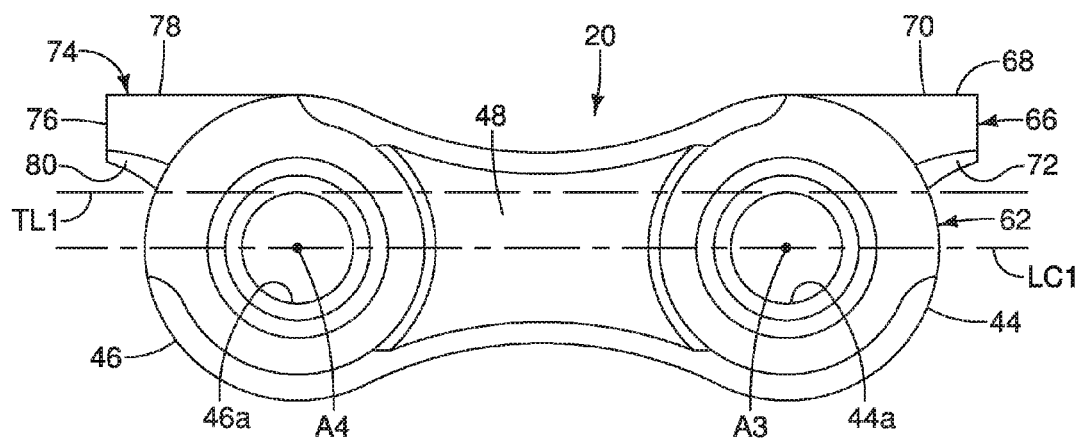
FIG. 10 is an inside elevational view of the inner link plate illustrated in FIG. 7.
Figure 11:
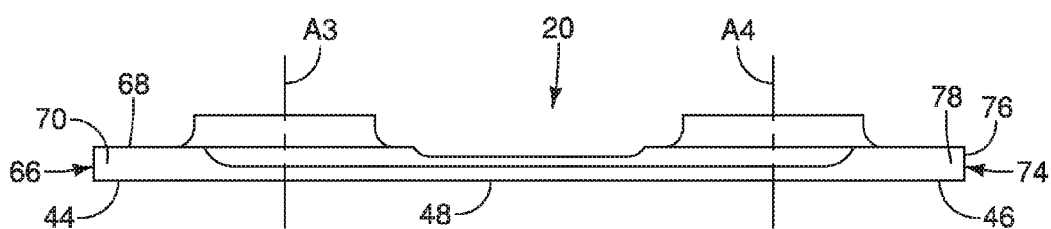
FIG. 11 is a top plan view of the inner link plate illustrated in FIG. 7.

Referring to FIGS. 9 and 10, a first tangent line TL1 is tangent to the third opening 44a and the fourth opening 46a. A majority of the first extended edge portion 66 is disposed mostly on one side of the first tangent line TL1. The side of the first tangent line TL1 on which a majority of the first extended edge portion 66 is mostly disposed is opposite to the other side of the first tangent line TL1 that is defined between the first longitudinal centerline LC1 and the first tangent line TL1. Preferably, an entirety of the first extended edge portion 66 is disposed on the side of the first tangent line TL1 that is opposite to the other side of the first tangent line TL1 on which the first longitudinal centerline LC1 is disposed.

Referring to FIGS. 2 to 5 and 7 to 11, the fourth end portion 46 of the first inner link plate 20 has a second extended edge portion 74 extending away from the third end portion 44 in the longitudinal direction. A majority of the second extended edge portion 74 is disposed in one of the first half 62 and the second half 64 defined by the first longitudinal centerline LC1. As shown in FIGS. 7 to 10, the second extended edge portion 74 is disposed entirely in the first half 62 of the first inner link plate 20. The second extended edge portion 74 is offset from the first longitudinal centerline LC1.

The second extended edge portion 74 defines a second projection 76 that is at least partially spaced away from the first longitudinal centerline LC1, as shown in FIGS. 7 to 11. The second projection 76 has a substantially planar upper surface 78 and a beveled lower surface 80 opposite the upper surface 78. The second projection 76 is integrally formed with the fourth end portion 46, the third end portion 44 and the second intermediate portion 48 as a single unitary member. Preferably, the first and second projections 68 and 76 are integrally formed with the third end portion 44, the fourth end portion 46 and the second intermediate portion 48 of the first inner link plate 20 as a single unitary member.

Alternatively, the second projection 76 is a separate member from the fourth end portion 46. When formed as a separate member, the second projection 76 includes a metallic material. Alternatively, when formed as a separate member, the second projection 76 includes a non-metallic material. The second projection 76 can be secured to the fourth end portion 46 in any suitable manner, such as by bonding, when formed as a separate member from the fourth end portion 46.

Referring to FIGS. 9 and 10, a majority of the second extended edge portion 74 is disposed mostly on one side of the first tangent line TL1. The side of the first tangent line TL1 on which a majority of the second extended edge portion 74 is mostly disposed is opposite to the other side of the first tangent line TL1 that is defined between the first longitudinal centerline LC1 and the first tangent line TL1. Preferably, an entirety of the second extended edge portion 74 is disposed on the side of the first tangent line TL1 that is opposite to the other side of the first tangent line TL1 on which the first longitudinal centerline LC1 is disposed.

Figure 12:
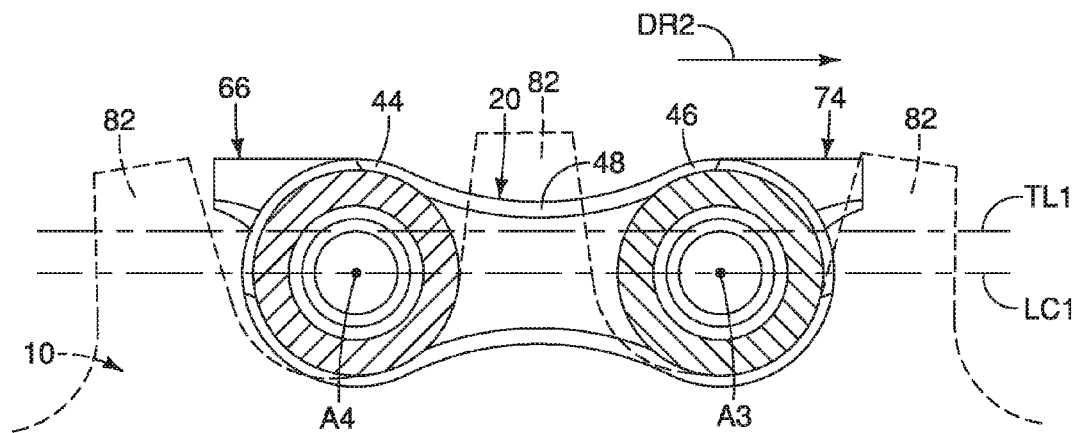
FIG. 12 is an enlarged partial elevational view of the inner link plate engaging a tooth of the bicycle rear sprocket.

Referring to FIGS. 4 and 5, a distance between the first and second outer link plates 18 and 22 in the axial direction is larger than a distance between the first and second inner link plates 20 and 24 in the axial direction. The first projection 68 and the second projection 76 extend into a space between the first and second outer link plates 18 and 22, thereby reducing the space between the first and second outer link plates 18 and 22. Accordingly, the first and second outer link plates 18 and 22 achieve a better hold on a received tooth 82. As shown in FIG. 12, the second extended edge portion 74 of the first inner link plate 20 overlaps with a top edge of the tooth 82 (received between the adjacent outer link) when viewed in the axial direction.

Figure 13:
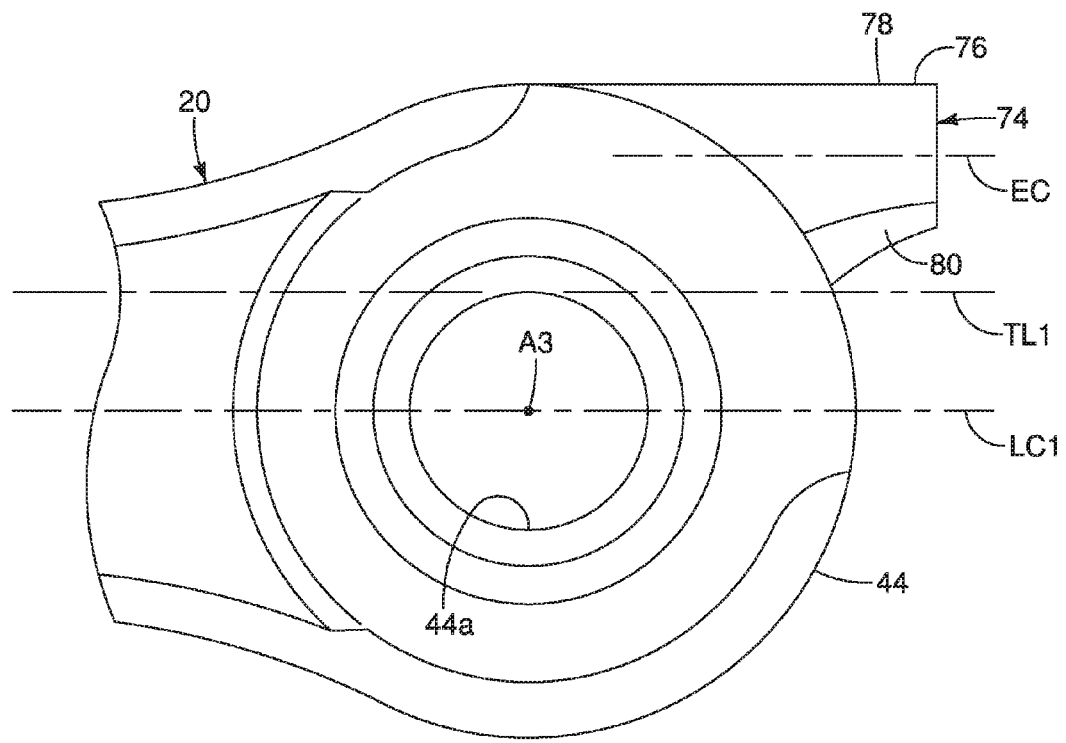
FIG. 13 is an enlarged partial inside elevational view of the inner link plate illustrated in FIG. 7.

Referring to FIG. 13, an extended edge portion centerline EC of the second extended edge portion 74 is parallel with the first longitudinal centerline LC1 of the first inner link plate 20. The extended edge portion centerline EC is offset from the first longitudinal centerline LC1. The extended edge portion centerline EC and the first longitudinal centerline LC1 are disposed on opposite sides of the first tangent line TL1.

Referring to FIG. 5, the second inner link plate 24 has the second longitudinal centerline LC2 perpendicular to the seventh and eighth center axes A7 and A5. The second longitudinal centerline LC2 defines the second longitudinal direction and bisects the second inner link plate 24 into a first half 63 and a second half 65. The first half 63 is the portion of the second inner link plate 24 above the second longitudinal centerline LC2. The second half 65 is the portion of the second inner link plate 24 below the second longitudinal centerline LC2.

The second inner link plate 24 includes third and fourth extended edge portions 84 and 86, as shown in FIGS. 3 to 5. Referring to FIGS. 4 and 5, the seventh end portion 56 of the second inner link plate 24 has a third extended edge portion 84 extending away from the eighth end portion 58 in the second longitudinal direction. A majority of the third extended edge portion 84 is disposed in one of the first half 63 and the second half 65 of the second inner link plate 24, as shown in FIG. 5. The third extended edge portion 84 is disposed entirely in the first half 63 of the second inner link plate 24. The third extended edge portion 84 is offset from the second longitudinal centerline LC2. The third extended edge portion 84 is configured substantially similarly as the first extended edge portion 66 such that further details thereof are not described herein.

Referring to FIGS. 4 and 5, the eighth end portion 58 of the second inner link plate 24 has a fourth extended edge portion 86 extending away from the seventh end portion 56 in the second longitudinal direction. A majority of the fourth extended edge portion 86 is disposed in one of the first half 63 and the second half 65 defined by the second longitudinal centerline LC2. As shown in FIG. 5, the fourth extended edge portion 86 is disposed entirely in the first half 63 of the second inner link plate 24. The fourth extended edge portion 86 is offset from the second longitudinal centerline LC2. The fourth extended edge portion 86 is configured substantially similarly as the second extended edge portion 74 such that further details thereof are not described herein.

Figure 14:
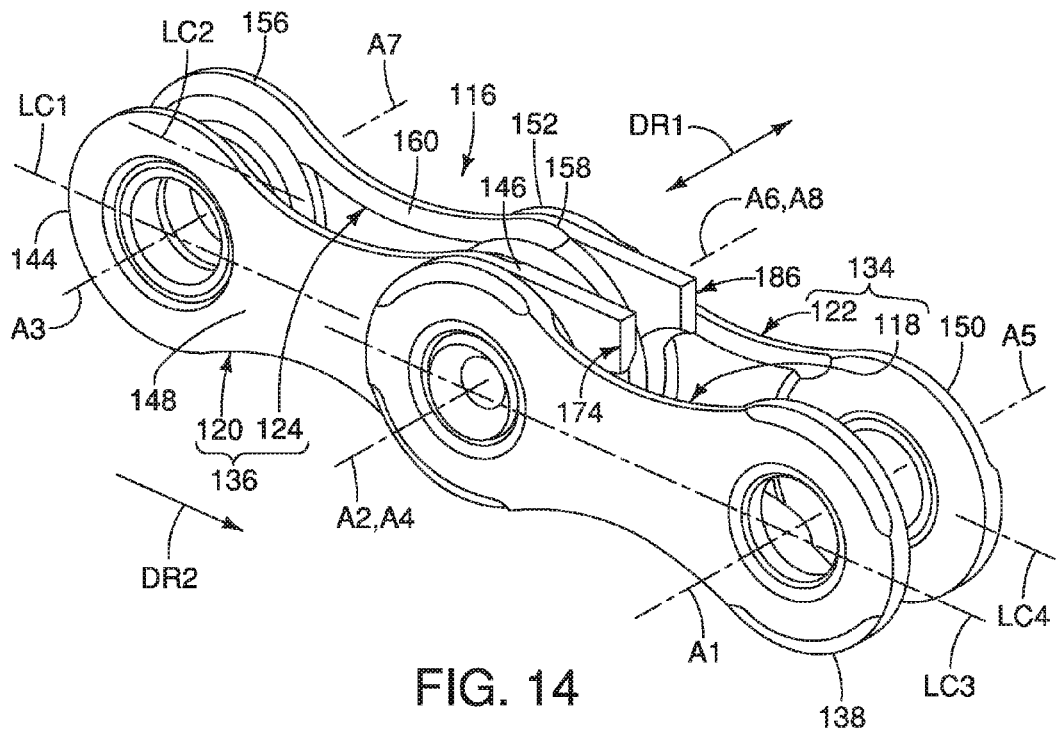
FIG. 14 is an enlarged perspective view of a portion of a bicycle chain in accordance with a second exemplary embodiment of the present invention in which end portions of both inner link plates of an inner link of the bicycle chain have extended edge portions.

As shown in FIG. 14, a bicycle chain 116 in accordance with a second exemplary embodiment of the present invention is substantially similar to the bicycle chain 16 of the first exemplary embodiment except for the differences described below. Similar parts are identified with similar reference numerals, except in the 100 series (i.e., 1xx). The second exemplary embodiment is directed to a bicycle chain 116 in which each inner link plate 120 and 124 of the inner link 136 has only one extended edge portion.

The outer ink plates 118 and 122 of the outer links 134 of the bicycle chain 116 in accordance with the second exemplary embodiment are substantially similar to the outer link plates 18 and 22 of the outer links 34 of the bicycle chain 16 in accordance with the first exemplary embodiment. The inner link plates 120 and 124 of the inner link 136 of the bicycle chain 116 include extended edge portions 174 and 186 only at one end of the inner link plates, as shown in FIG. 14. Accordingly, the inner link 136 includes only the second and fourth extended edge portions 174 and 186 (i.e., the first and third extended edge portions 66 and 84 of the first exemplary embodiment are absent in the second exemplary embodiment). The second extended edge portion 174 extends from the fourth end portion 146 of the first inner link plate 120 in the longitudinal direction away from the third end portion 144. The fourth extended edge portion 186 extends from the eighth end portion 158 of the second inner link plate 124 in the longitudinal direction away from the seventh end portion 156. The second and fourth extended edge portions 174 and 186 are disposed at downstream ends of the first and second inner link plates 120 and 124 of the inner links 136. Alternatively, the second and fourth extended edge portions 174 and 186 can be disposed at upstream ends of the first and second inner link plates 120 and 124. Alternatively, one extended edge portion is disposed at an upstream end of one inner link plate and the other extended edge portion is disposed at a downstream end of the other inner link plate.

The second and fourth extended edge portions 174 and 186 are configured substantially similarly to the extended edge portions 74 and 86 of the first exemplary embodiment. A majority of the second extended edge portion 174 is disposed in one of the first half and the second half defined by the first longitudinal centerline LC1 of the first inner link plate 120. A majority of the fourth extended edge portion 186 is disposed in one of the first half and the second half defined by the second longitudinal centerline LC2 of the second inner link plate 124.

As shown in FIG. 14, the space between the first and second outer link plates 118 and 122 in the axial direction is reduced by the second and fourth extended edge portions 174 and 186 extending into the space between the first and second outer link plates 118 and 122. Accordingly, the first and second outer link plates 118 and 122 achieve a better hold on a received tooth 82 (FIGS. 1, 2 and 12).

Figure 15:
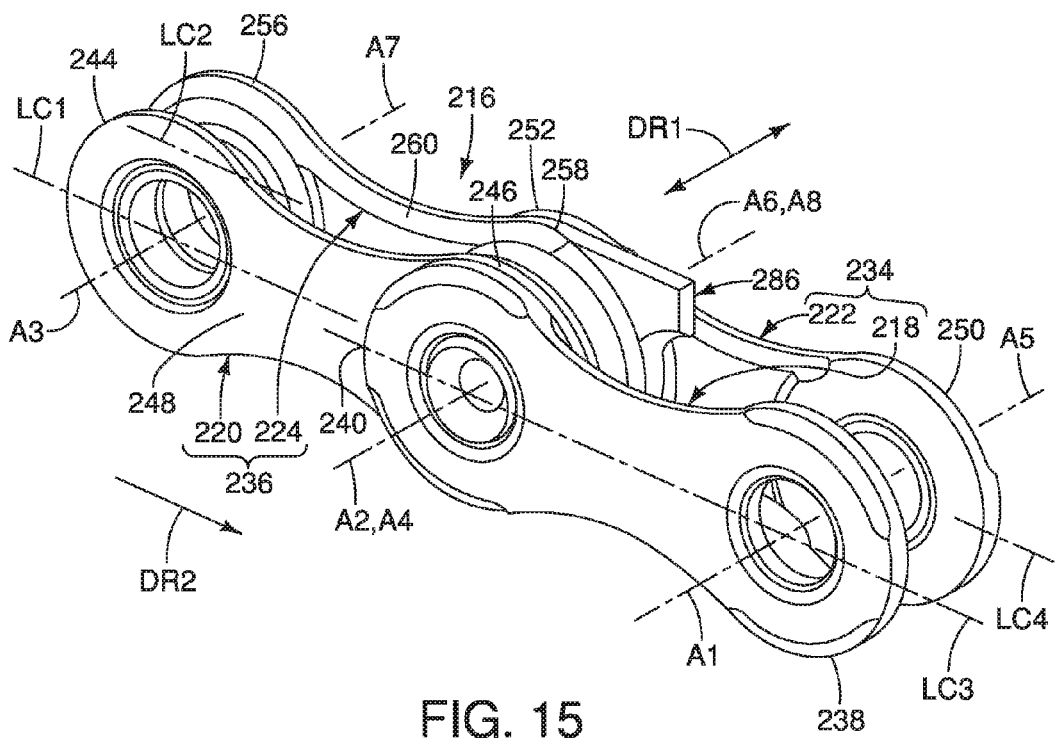
FIG. 15 is an enlarged perspective view of a portion of a bicycle chain in accordance with a third exemplary embodiment of the present invention in which an inner link plate of the bicycle chain has an extended edge portion.
Figure 16:
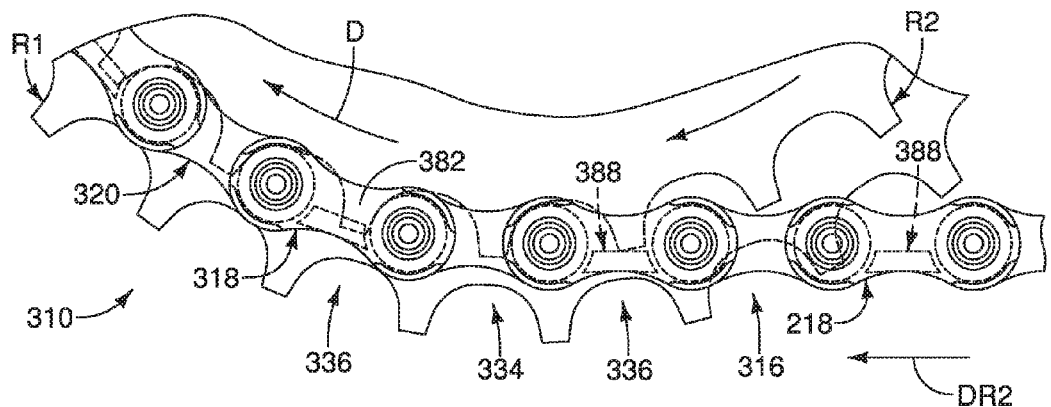
FIG. 16 is an outside partial elevational view of a bicycle chain in accordance with a fourth exemplary embodiment of the present invention engaging a bicycle rear sprocket.
Figure 17:
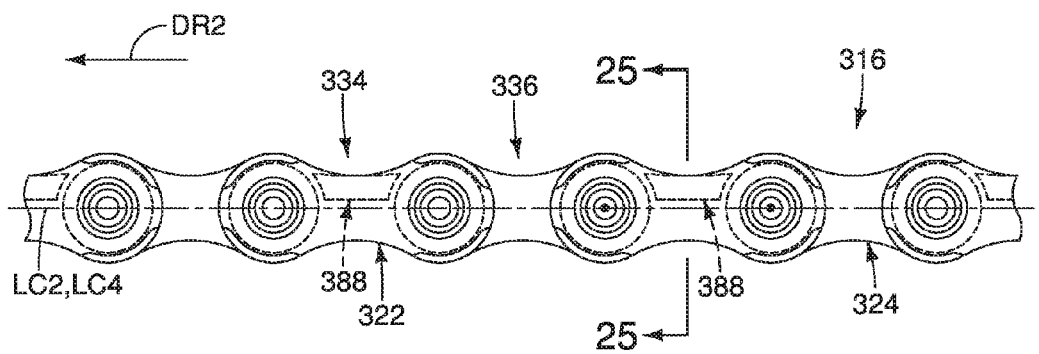
FIG. 17 is a partial side elevational view of the bicycle chain illustrated in FIG. 16.

As shown in FIG. 15, a bicycle chain 216 in accordance with a third exemplary embodiment of the present invention is substantially similar to the bicycle chain 16 of the first exemplary embodiment except for the differences described below. Similar parts are identified with similar reference numerals, except in the 200 series (i.e., 2xx). The third exemplary embodiment of the present invention is directed to a bicycle chain 216 in which the inner link 236 has only one extended edge portion.

The outer link plates 218 and 222 of the outer links 234 of the bicycle chain 216 in accordance with the third exemplary embodiment are substantially similar to the outer link plates 18 and 22 of the outer links 34 of the bicycle chain 16 in accordance with the first exemplary embodiment. The second inner link plate 224 of the inner link 236 of the bicycle chain 216 includes an extended edge portion 286 only at one end of the inner link plate, as shown in FIG. 15. Accordingly, the inner link 236 includes only the fourth extended edge portion 286 the first, second and third extended edge portions 66, 74 and 84 of the first exemplary embodiment are absent in the third exemplary embodiment). The eighth end portion 258 has the fourth extended edge portion 286 extending away from the seventh end portion 256 in the second longitudinal direction. The seventh end portion 256 of the second inner link plate 224 is free of an extended edge portion extending away from the eighth end portion 258 in the second longitudinal direction. The first inner link plate 220 does not have an extended edge portion, such that the third end portion 244 is free of an extended edge portion extending away from the fourth end portion 246 in the first longitudinal direction, and the fourth end portion 246 is free of an extended edge portion extending away from the third end portion 244 in the first longitudinal direction. The fourth extended edge portion 286 extends from the eighth edge portion 258 of the second inner link plate 224 in the longitudinal direction away from the seventh edge portion 256. The fourth extended edge portion 286 is disposed at a downstream end of the second inner link plate 224 of the inner link 236. Alternatively, the extended edge portion can extend in a longitudinal direction from any of the end portions of either the first or second inner link plate 220 and 224.

The fourth extended edge portion 286 is configured substantially similarly to the fourth extended edge portion 86 of the first exemplary embodiment. A majority of the fourth extended edge portion 286 is disposed in one of the first half and the second half defined by the second longitudinal centerline LC2 of the second inner link plate 224.

As shown in FIG. 15, the space between the first and second outer link plates 218 and 222 in the axial direction is reduced by the fourth extended edge portion 286 extending into the space between the first and second outer link plates 218 and 222. Accordingly, the first and second outer link plates 218 and 222 achieve a better hold on a received tooth 82 (FIGS. 1, 2 and 12).

As shown in FIGS. 16 to 25, a bicycle chain 316 in accordance with a fourth exemplary embodiment of the present invention is substantially similar to the bicycle chain 16 of the first exemplary embodiment except for the differences described below. Similar parts are identified with similar reference numerals, except in the 300 series (i.e., 3xx). The fourth exemplary embodiment of the present invention is directed to a bicycle chain 316 in which each outer link plate 318 and 322 of the outer link 334 has an axial protrusion.

The first and second inner link plates 320 and 324 of the fourth exemplary embodiment are substantially similar to the first and second inner link plates 20 and 24 of the first exemplary embodiment except that the first and second inner link plates 320 and 324 are free of extending edge portions.

Figure 18:
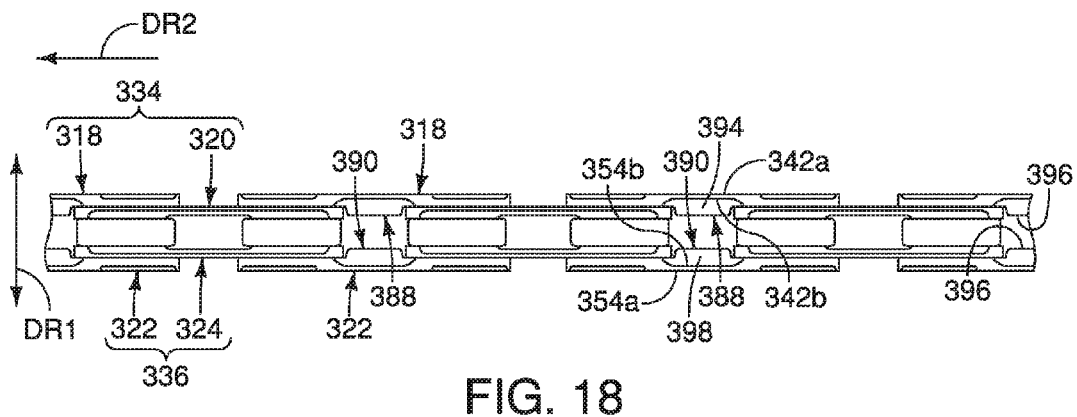
FIG. 18 is a partial plan view of the bicycle chain illustrated in FIG. 16.
Figure 19:
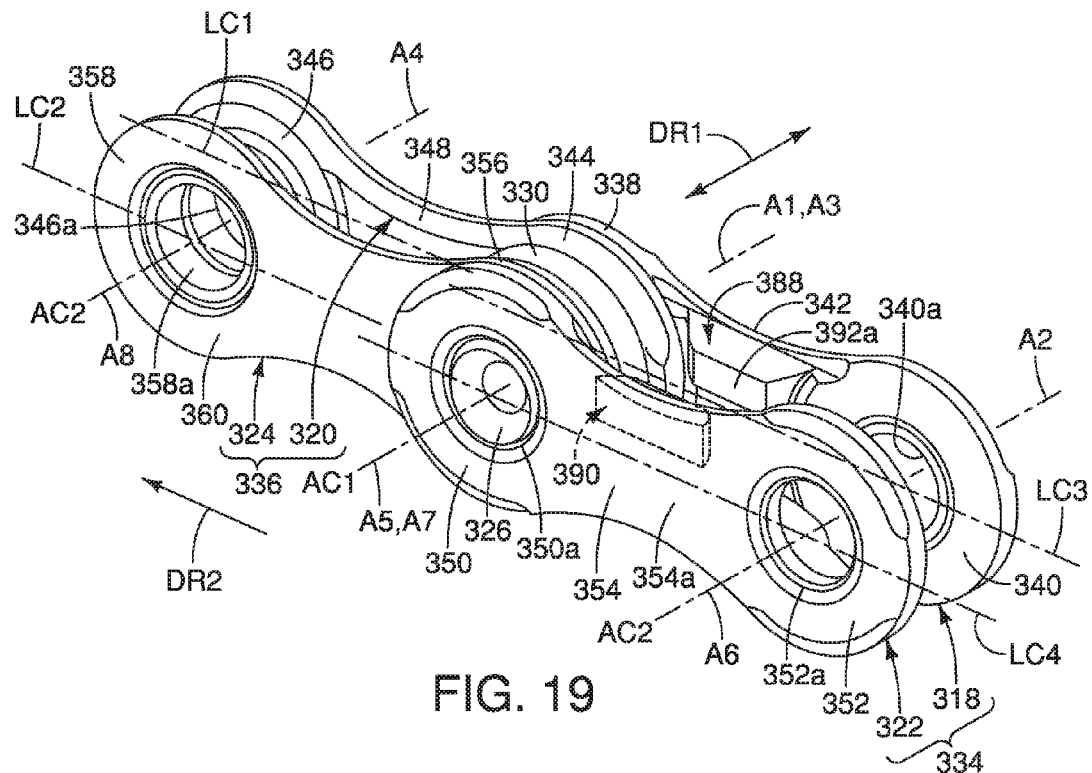
FIG. 19 is an enlarged perspective view of a portion of the bicycle chain illustrated in FIG. 16.

The first and second outer link plates 318 and 322 of the fourth exemplary embodiment are substantially similar to the first and second outer link plates 18 and 22 of the first exemplary embodiment except that the first outer link plate 318 and the second outer link plate 322 include a first axial protrusion 388 and a second axial protrusion 390, respectively, as shown in FIGS. 18 and 19.

The first intermediate portion 342 of the first outer link plate 318 has an outer surface 342a and an inner surface 342b, as shown in FIGS. 18, 20 to 22 and 25. The inner surface 342b is opposite to the outer surface 342a in an axial direction that is parallel to the first center axis A1. The first axial protrusion 388 of the first outer link plate 318 protrudes from the inner surface 342b of the first intermediate portion 342 in the axial direction.

Figure 20:
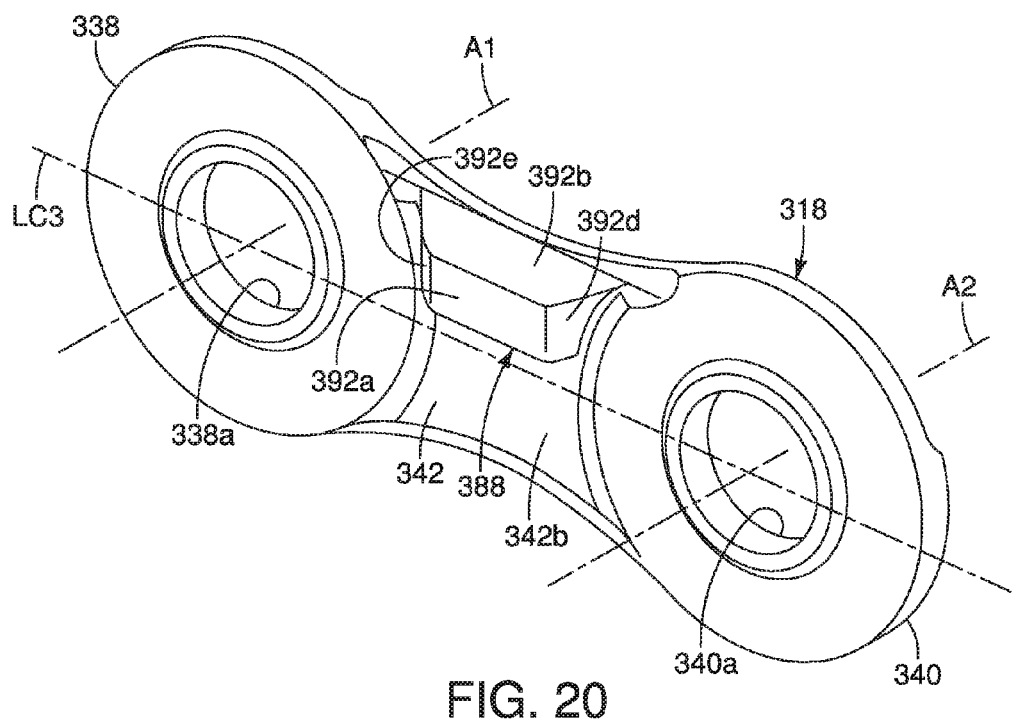
FIG. 20 is an inside perspective view of an outer link plate illustrated in FIG. 19.
Figure 21:
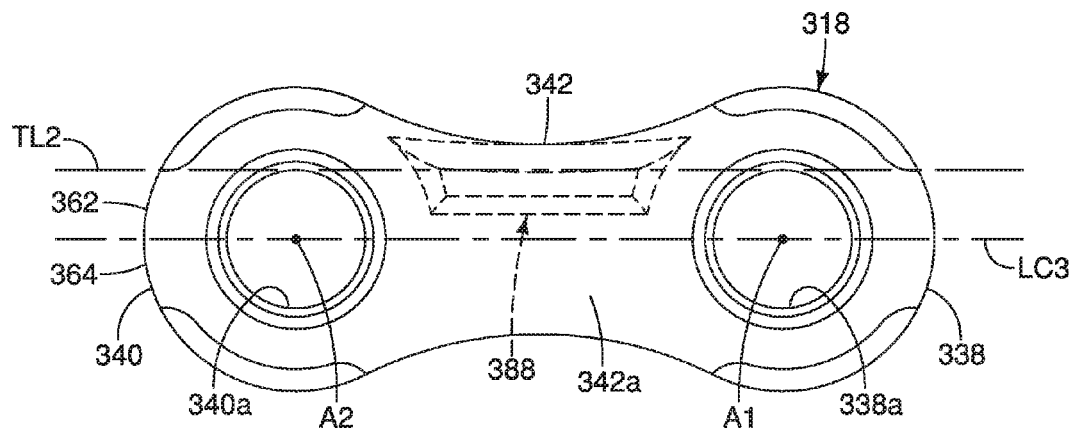
FIG. 21 is an outside elevational view of the outer link plate illustrated in FIG. 19.

Referring to FIGS. 17, 20 to 22 and 24, the first outer link plate 318 has the third longitudinal centerline LC3 perpendicular to the first and second center axes A1 and A2. The third longitudinal centerline LC3 defines the third longitudinal direction and bisects the first outer link plate 318 into a first half 362 and a second half 364, as shown in FIG. 21.

The first half 362 is the portion of the first outer link plate 318 above the third longitudinal centerline LC3, and the second half 364 is the portion of the first outer link plate 318 below the third longitudinal centerline LC3. The first axial protrusion 388 is offset from the third longitudinal centerline LC3. The first axial protrusion 388 is spaced away from the third longitudinal centerline LC3.

Figure 22:
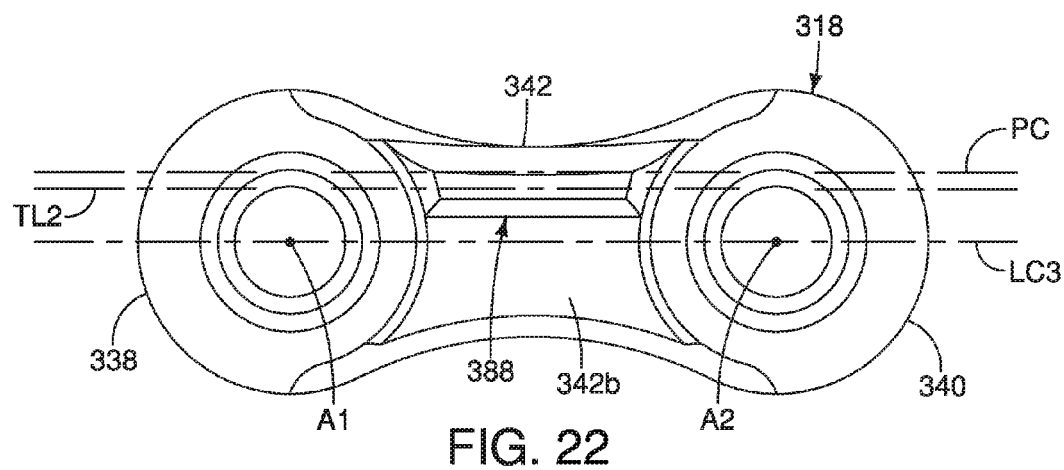
FIG. 22 is an inside elevational view of the outer link plate illustrated in FIG. 19.

Referring to FIGS. 21 and 22, a second tangent line TL2 is tangent to the first opening 338a and the second opening 340a. A majority of the first axial protrusion 388 is disposed mostly on one side of the second tangent line TL2. The side of the second tangent line TL2 on which a majority of the first axial protrusion 388 is mostly disposed is opposite to the other side of the second tangent line TL2 that is defined between the third longitudinal centerline LC3 and the second tangent line TL2.

Referring to FIGS. 22 and 24, an axial protrusion centerline PC extends in the third longitudinal direction parallel to the third longitudinal centerline LC3. The axial protrusion centerline PC is offset from the third longitudinal centerline LC3.

Figure 23:
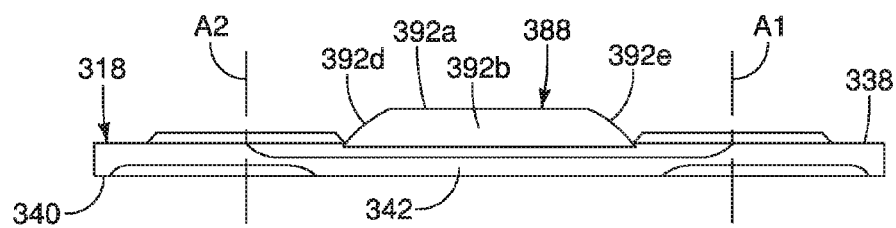
FIG. 23 is a top plan view of the outer link plate illustrated in FIG. 19.

The first axial protrusion 388 has a substantially planar axial end surface 392a, as shown in FIGS. 18 and 25. The axial end surface 392a is offset from the inner surface 342b in the axial direction. An upper surface 392b is inclined relative to the axial end surface 392a towards the third longitudinal centerline LC3, as shown in FIGS. 20 and 25. Preferably, a lower surface 392c and side surfaces 392d and 392e are inclined relative to the axial end surface 392a, as shown in FIGS. 19, 20, 23 and 25. The first axial protrusion 388 is integrally formed with the first end portion 338, the second end portion 340 and the first intermediate portion 342 as a single unitary member, as shown in FIGS. 20, 23 and 25.

The third intermediate portion 354 of the second outer link plate 322 has an outer surface 354a and an inner surface 354b, as shown in FIGS. 18, 19 and 25. The inner surface 354b is opposite to the outer surface 354a in an axial direction that is parallel to the fifth center axis A5. The second axial protrusion 390 of the second outer link plate 322 protrudes from the inner surface 354b of the third intermediate portion 354 in the axial direction. The second axial protrusion 390 is similarly disposed on the third intermediate portion 354 with respect to the fourth longitudinal center line LC4 and to a tangent line tangent to the fifth and sixth openings 350a and 352a as the first axial protrusion 388 is disposed on the first intermediate portion 342. Accordingly, the second axial protrusion 390 is offset from the fourth longitudinal centerline LC4, as shown in FIG. 19.

The second axial protrusion 390 is similarly configured as the first axial protrusion 388, as shown in FIGS. 18, 19 and 25. The second axial protrusion 390 has a substantially planar axial end surface 394a, as shown in FIG. 25. The axial end surface 394a is offset from the inner surface 354b in the axial direction. An upper surface 394b is inclined relative to the axial end surface 394a towards the fourth longitudinal centerline LC4. Preferably, a lower surface 394c and side surfaces are inclined relative to the axial end surface 394a. The second axial protrusion 390 is integrally formed with the fifth end portion 350, the sixth end portion 352 and the third intermediate portion 354 as a single unitary member, as shown in FIGS. 18, 19 and 25.

The first and second axial protrusions 388 and 390 reduce the axial distance between the inner surfaces 342b and 354b of the first and third intermediate portions 342 and 354 of the first and second outer link plates 318 and 322, as shown in FIGS. 18, 19 and 25, thereby facilitating holding the received sprocket tooth 382 (FIGS. 16 and 24) between the first and second outer link plates 318 and 322 of the outer link 334. As shown in FIG. 24, the first axial protrusion 388 of the first intermediate portion 342 of the first outer link plate 318 overlaps with a top edge of the tooth 382 (received between the adjacent outer link) when viewed in the axial direction.

As shown in FIG. 26, an outer link 434 in accordance with a fifth exemplary embodiment of the present invention is substantially similar to the outer link 334 of the fourth exemplary embodiment except for the differences described below. Similar parts are identified with similar reference numerals, except in the 400 series (i.e., 4xx). The fifth exemplary embodiment of the present invention is directed to an outer link 434 of a bicycle chain in which an axial protrusion is a separate member from the first intermediate portion of the first outer link plate.

The first axial protrusion 488 is a separate member from the first intermediate portion 442 of the first outer link plate 418. As shown in FIG. 26, when the first axial protrusion 488 is formed as a separate member, the first axial protrusion 488 includes a non-metallic material. Alternatively, the first axial protrusion 488 includes a metallic material when the first axial protrusion 488 is formed as a separate member. The first axial protrusion 488 can be secured to the inner surface 442b of the first intermediate portion in any suitable manner, such as by bonding, when the first axial protrusion 488 is formed as a separate member. The second axial protrusion 490 is similarly configured as the first axial protrusion 488.

Figure 27:
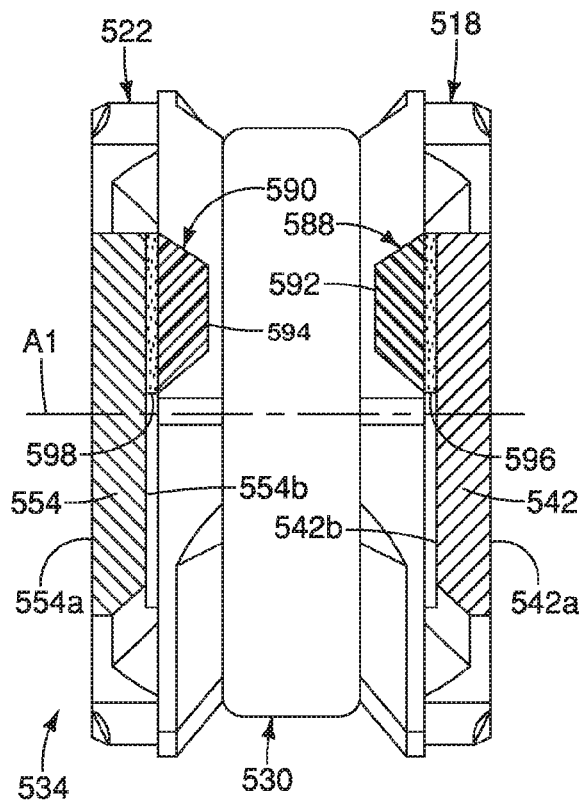
FIG. 27 is a cross-sectional view of a bicycle chain in accordance with a sixth exemplary embodiment of the present invention in which an axial protrusion is bonded to an outer link plate.

As shown in FIG. 27, an outer link 534 in accordance with a sixth exemplary embodiment of the present invention is substantially similar to the outer link 434 of the fifth exemplary embodiment except for the differences described below. Similar parts are identified with similar reference numerals, except in the 500 series (i.e., 5xx). The fifth exemplary embodiment of the present invention is directed to an outer link 534 of a bicycle chain in which an axial protrusion is bonded to an outer link plate of the outer link 534.

A first bonding layer 596 bonds the first axial protrusion 588 to the inner surface 542b of the first intermediate portion 542 of the first outer link plate 518 of the outer link 534, as shown in FIG. 27. The first bonding layer 596 can be any suitable layer to secure the first axial protrusion 588 to the inner surface 542b of the first intermediate portion 542, such as an adhesive or a weld. A second bonding layer 598 is substantially similarly configured as the first bonding layer 596 to secure the second axial protrusion 590 to the inner surface 554b of the third intermediate portion 554 of the second outer link plate 522.

Figure 28:
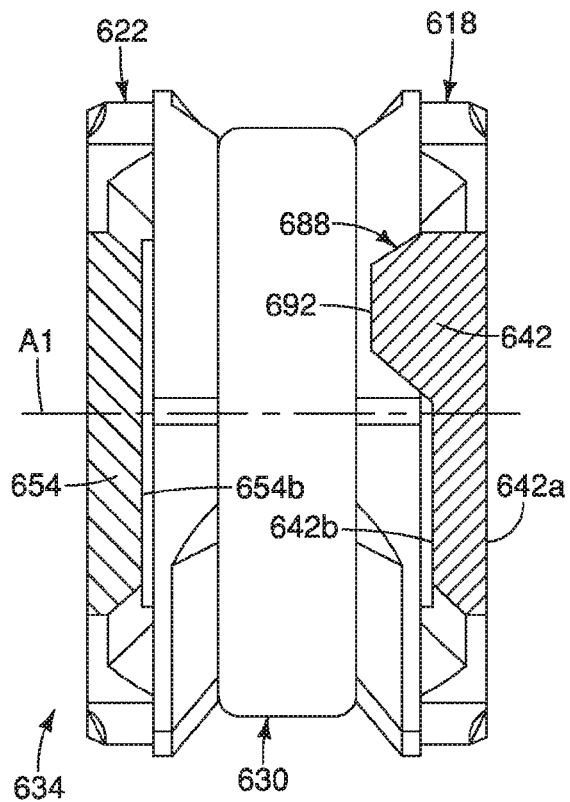
FIG. 28 is a cross-sectional view of a bicycle chain in accordance with a seventh exemplary embodiment of the present invention in which an outer link plate of an outer link of the bicycle chain has an axial protrusion.

As shown in FIG. 28, an outer link 634 in accordance with a seventh exemplary embodiment of the present invention is substantially similar to the outer link 334 of the fourth exemplary embodiment except for the differences described below. Similar parts are identified with similar reference numerals, except in the 600 series (6xx). The seventh exemplary embodiment of the present invention is directed to an outer link 634 of a bicycle chain in which only one of the first and second outer link plates has an axial protrusion.

The first outer link plate 618 of the outer link 634 is substantially similarly configured as the first outer link plate 318 of the fourth exemplary embodiment. The axial protrusion 688 protrudes from the inner surface 642b in the axial direction. The second outer link plate 622 is substantially similar to the second outer link plate 322 of the fourth exemplary embodiment except that the second outer link plate 622 does not have an axial protrusion extending from the inner surface 654b. Accordingly, the inner surface 654b of the intermediate portion 654 of the second outer link plate 622 is free of an axial protrusion protruding from the inner surface 654b in the axial direction.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the link plate for a bicycle chain. Accordingly, these directional terms, as utilized to describe the link plate for a bicycle chain should be interpreted relative to a bicycle in an upright riding position on a horizontal surface and that is equipped with the link plate for a bicycle chain. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An inner link plate for a bicycle chain, the inner link plate having an inner-link longitudinal centerline defining a longitudinal direction and comprising:
   a first inner-link end portion including a first inner-link opening having a first inner-link center axis;
   a second inner-link end portion including a second inner-link opening having a second inner-link center axis parallel to the first inner-link center axis; and
   an inner-link intermediate portion interconnecting the first inner-link end portion and the second inner-link end portion,
   the inner-link longitudinal centerline bisecting the inner link plate into a first half and a second half,
   the first inner-link end portion having a first extended edge portion extending away from the second inner-link end portion in the longitudinal direction, a majority of the first extended edge portion being disposed on one of the first half and the second half, an upper surface of the first extended edge portion being an uppermost portion of the inner link plate.

2. The inner link plate according to claim 1, wherein the first extended edge portion is offset from the inner-link longitudinal centerline.

3. The inner link plate according to claim 1, wherein the first extended edge portion defines a projection that is at least partially spaced away from the inner-link longitudinal centerline.

4. The inner link plate according to claim 3, wherein the projection is integrally formed with the first inner-link end portion, the second inner-link end portion and the inner-link intermediate portion as a single unitary member.

5. The inner link plate according to claim 3, wherein the projection is a separate member from the first inner-link end portion.

6. The inner link plate according to claim 5, wherein the projection includes a metallic material.

7. The inner link plate according to claim 5, wherein the projection includes a non-metallic material.

8. The inner link plate according to claim 1, wherein a majority of the first extended edge portion is disposed mostly on one side of a tangent line that is tangent to the first inner-link opening and the second inner-link opening and that is opposite to the other side of the tangent line that is defined between the inner-link longitudinal centerline and the tangent line.

9. The inner link plate according to claim 1, wherein the second inner-link end portion has a second extended edge portion extending away from the first inner-link end portion in the longitudinal direction, a majority of the second extended edge portion being disposed on the one of the first half and the second half.

10. The inner link plate according to claim 9, wherein the first extended edge portion defines a first projection that is spaced away from the inner-link longitudinal centerline, and
the second extended edge portion defines a second projection that is spaced away from the inner-link longitudinal centerline.

11. The inner link plate according to claim 10, wherein the first and second projections are integrally formed with the first inner-link end portion, the second inner-link end portion and the inner-link intermediate portion as a single unitary member.

12. A bicycle chain link comprising:
a primary inner link plate having a primary inner-link longitudinal centerline defining a primary longitudinal direction, the primary inner link plate comprising:
   a first inner-link end portion including a first inner-link opening having a first inner-link center axis;
   a second inner-link end portion including a second inner-link opening having a second inner-link center axis parallel to the first inner-link center axis; and
   a primary inner-link intermediate portion interconnecting the first inner-link end portion and the second inner-link end portion,
   the primary inner-link longitudinal centerline bisecting the primary inner link plate into a first half and a second half,
   the first inner-link end portion having a first extended edge portion extending away from the second inner-link end portion in the primary longitudinal direction, a majority of the first extended edge portion being disposed on one of the first half and the second half, an upper surface of the first extended edge portion being an uppermost portion of the inner link plate; and
a secondary inner link plate having a secondary inner-link longitudinal centerline defining a secondary longitudinal direction, the secondary inner link plate comprising:
   a third inner-link end portion including a third inner-link opening having a third inner-link center axis;
   a fourth inner-link end portion including a fourth inner-link opening having a fourth inner-link center axis parallel to the third inner-link center axis; and
   a secondary inner-link intermediate portion interconnecting the third inner-link end portion and the fourth inner-link end portion.

13. The bicycle chain link according to claim 12, wherein the secondary inner-link longitudinal centerline bisects the secondary inner link plate into a first half and a second half,
the third inner-link end portion has a third extended edge portion extending away from the fourth inner-link end portion in the secondary longitudinal direction, and a majority of the third extended edge portion is disposed on one of the first half and the second half of the secondary inner link plate.

14. The bicycle chain link according to claim 12, wherein the third inner-link end portion is free of an extended edge portion extending away from the fourth inner-link end portion in the secondary longitudinal direction.

* * * * *